US008233209B2

(12) United States Patent
Miyatake et al.

(10) Patent No.: US 8,233,209 B2
(45) Date of Patent: Jul. 31, 2012

(54) OPTICAL SCANNING DEVICE AND IMAGE FORMING APPARATUS

(75) Inventors: Naoki Miyatake, Kanagawa (JP); Yoshinori Hayashi, Kanagawa (JP); Makoto Hirakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 700 days.

(21) Appl. No.: 12/020,292

(22) Filed: Jan. 25, 2008

(65) Prior Publication Data
US 2008/0180772 A1 Jul. 31, 2008

(30) Foreign Application Priority Data

Jan. 31, 2007 (JP) ................................. 2007-021613
Feb. 6, 2007 (JP) ................................. 2007-026304
Feb. 9, 2007 (JP) ................................. 2007-029878

(51) Int. Cl.
*G02B 26/08* (2006.01)
(52) U.S. Cl. ................... 359/204.1; 359/219.2
(58) Field of Classification Search ............... 359/219.2, 359/204.1–204.3
See application file for complete search history.

(56) References Cited

U.S. PATENT DOCUMENTS

| | | | |
|---|---|---|---|
| 4,578,688 A | 3/1986 | Okuno | |
| 5,610,647 A | 3/1997 | Takada | |
| 5,870,132 A | 2/1999 | Inoue et al. | |
| 6,326,992 B1 | 12/2001 | Inoue et al. | |
| 6,462,853 B2 | 10/2002 | Hayashi | |
| 6,587,245 B2 | 7/2003 | Hayashi | |
| 6,621,512 B2 | 9/2003 | Nakajima et al. | |
| 6,657,765 B2 | 12/2003 | Hayashi et al. | |
| 6,756,583 B2 | 6/2004 | Yamawaki | |
| 6,757,089 B2 | 6/2004 | Hayashi | |
| 6,768,506 B2 | 7/2004 | Hayashi et al. | |
| 6,771,296 B2 | 8/2004 | Hayashi et al. | |
| 6,771,300 B2 | 8/2004 | Amada et al. | |
| 6,771,407 B2 | 8/2004 | Hayashi et al. | |
| 6,788,444 B2 | 9/2004 | Suzuki et al. | |
| 6,803,941 B2 | 10/2004 | Hayashi et al. | |
| 6,804,064 B2 | 10/2004 | Hirakawa | |
| 6,813,051 B2 | 11/2004 | Suzuki et al. | |

(Continued)

FOREIGN PATENT DOCUMENTS

JP 59-188616 10/1984

(Continued)

OTHER PUBLICATIONS

U.S. Appl. No. 12/025,343, filed Feb. 4, 2008, Miyatake et al.

(Continued)

*Primary Examiner* — Jennifer L. Doak
(74) *Attorney, Agent, or Firm* — Oblon, Spivak, McClelland, Maier & Neustadt, L.L.P.

(57) ABSTRACT

An optical scanning system includes a light source, a polygon mirror, a first optical system, a second optical system, and a monitoring device. The light source includes a plurality of light-emitting units. The first optical system is arranged on an optical path of light beams, and guides the light beams from the light source to the polygon mirror. The second optical system guides the light beams deflected by the polygon mirror to a photosensitive drum. The monitoring device monitors light amount of light beams emitted from the light-emitting units. An optical axis of a coupling lens and a cylindrical lens is inclined from a normal of a deflection-reflection surface of the polygon mirror with respect to a sub-scanning direction.

12 Claims, 23 Drawing Sheets

U.S. PATENT DOCUMENTS

| | | |
|---|---|---|
| 6,829,102 B2 | 12/2004 | Ohashi et al. |
| 6,903,856 B2 | 6/2005 | Hayashi |
| 6,906,739 B2 | 6/2005 | Suzuki et al. |
| 6,934,061 B2 | 8/2005 | Ono et al. |
| 6,956,685 B2 | 10/2005 | Hayashi |
| 6,987,593 B2 | 1/2006 | Hayashi et al. |
| 7,006,120 B2 | 2/2006 | Sakai et al. |
| 7,050,082 B2 | 5/2006 | Suzuki et al. |
| 7,050,210 B2 | 5/2006 | Atsuumi et al. |
| 7,068,296 B2 | 6/2006 | Hayashi et al. |
| 7,088,484 B2 | 8/2006 | Hayashi et al. |
| 7,106,483 B2 | 9/2006 | Hayashi et al. |
| 7,145,705 B2 | 12/2006 | Hayashi |
| 7,161,724 B1 | 1/2007 | Miyatake |
| 7,167,288 B2 | 1/2007 | Miyatake et al. |
| 7,218,432 B2 | 5/2007 | Ichii et al. |
| 7,236,281 B2 | 6/2007 | Hayashi et al. |
| 7,253,937 B2 | 8/2007 | Ueda et al. |
| 7,271,823 B2 | 9/2007 | Izumi et al. |
| 7,271,824 B2 | 9/2007 | Omori et al. |
| 7,277,212 B2 | 10/2007 | Miyatake et al. |
| 2003/0053156 A1 | 3/2003 | Satoh et al. |
| 2004/0036936 A1 | 2/2004 | Nakajima et al. |
| 2004/0240000 A1 | 12/2004 | Miyatake et al. |
| 2005/0098716 A1* | 5/2005 | Yoshikawa et al. ........... 250/235 |
| 2005/0243396 A1 | 11/2005 | Fujii et al. |
| 2006/0077500 A1 | 4/2006 | Hayashi et al. |
| 2006/0164709 A1* | 7/2006 | Tomita et al. ................ 359/205 |
| 2006/0203264 A1 | 9/2006 | Miyatake |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0002417 A1 | 1/2007 | Hirakawa et al. |
| 2007/0030538 A1 | 2/2007 | Hirakawa et al. |
| 2007/0058255 A1 | 3/2007 | Imai et al. |
| 2007/0211324 A1 | 9/2007 | Sakai et al. |
| 2007/0215800 A1 | 9/2007 | Miyatake et al. |
| 2007/0216754 A1 | 9/2007 | Miyatake |
| 2007/0253048 A1 | 11/2007 | Sakai et al. |
| 2007/0297036 A1 | 12/2007 | Nakamura et al. |

FOREIGN PATENT DOCUMENTS

| | | |
|---|---|---|
| JP | 11-14932 | 1/1999 |
| JP | 11-38348 | 2/1999 |
| JP | 11-64759 | 3/1999 |
| JP | 2000-267031 | 9/2000 |
| JP | 2001-4942 | 1/2001 |
| JP | 2001-83452 | 3/2001 |
| JP | 2001-305462 | 10/2001 |
| JP | 2002-23085 | 1/2002 |
| JP | 2002-264391 | 9/2002 |
| JP | 2003-5114 | 1/2003 |
| JP | 3450653 | 7/2003 |
| JP | 2004-70109 | 3/2004 |
| JP | 2004-230654 | 8/2004 |
| JP | 2004-287292 | 10/2004 |
| JP | 2005-070067 | 3/2005 |
| JP | 2005-250319 | 9/2005 |
| JP | 2006-91157 | 4/2006 |
| JP | 2006-91879 | 4/2006 |
| JP | 2006-088569 | 6/2006 |
| JP | 2006-198881 | 8/2006 |
| JP | 2006-258983 | 9/2006 |
| JP | 2006-259574 | 9/2006 |
| JP | 2006-301205 | 11/2006 |
| JP | 2006-350167 | 12/2006 |

OTHER PUBLICATIONS

U.S. Appl. No. 12/107,379, filed Apr. 22, 2008, Hirakawa et al.
U.S. Appl. No. 12/190,182, filed Aug. 12, 2008, Ichii et al.
U.S. Appl. No. 12/193,902, filed Aug. 19, 2008, Miyatake.
Office Action issued Jun. 1, 2011, in Japanese Patent Application No. 2007-021613.
Office Action issued Jul. 12, 2011, in Japanese Patent Application No. 2007-029878.
Japanese Office Action issued Dec. 6, 2011 in patent application No. 2007-029878.
Office Action issued Feb. 13, 2012, in Japanese Patent Application No. 2007-021613.

* cited by examiner

FIG. 13

| WAVEBAND | 780 nm | | 850 nm (Ref.) |
|---|---|---|---|
| MATERIAL SYSTEM OF SPACER LAYER/QUANTUM WELL LAYER | AlGaAs/AlGaAs | AlGaInP/GaInPAs | AlGaAs/GaAs |
| SPACER LAYER | Al$_{0.6}$Ga$_{0.4}$As (Eg=2.0226 eV) | (Al$_x$Ga$_{1-x}$)$_{0.5}$In$_{0.5}$P (Eg(x=0.7)=2.324 eV) | Al$_{0.6}$Ga$_{0.4}$As (Eg=2.0226 eV) |
| ACTIVE LAYER — QUANTUM WELL LAYER | Al$_{0.12}$Ga$_{0.88}$As (Eg=1.5567 eV) | GaInPAs (COMPRESSIVE DISTORTION) (Eg=1.5567 eV) | GaAs (Eg=1.42 eV) |
| ACTIVE LAYER — BARRIER LAYER | Al$_{0.3}$Ga$_{0.7}$As (Eg=1.78552 eV) | Ga$_x$In$_{1-x}$P (TENSILE DISTORTION) (Eg(x=0.6)=2.02 eV) | Al$_{0.3}$Ga$_{0.7}$As (Eg=1.78552 eV) |
| DIFFERENCE OF Eg (ΔEg) BETWEEN SPACER LAYER AND QUANTUM WELL LAYER | 465.9 meV | 767.3 meV | 602.6 meV |
| DIFFERENCE OF Eg (ΔEg) BETWEEN BARRIER LAYER AND QUANTUM WELL LAYER | 228.8 meV | 463.3 meV | 365.5 meV |

OPTICAL SCANNING DEVICE AND IMAGE FORMING APPARATUS

CROSS-REFERENCE TO RELATED APPLICATIONS

The present application claims priority to and incorporates by reference the entire contents of Japanese priority documents 2007-021613 filed in Japan on Jan. 31, 2007, 2007-026304 filed in Japan on Feb. 6, 2007, and 2007-029878 filed in Japan on Feb. 9, 2007.

BACKGROUND OF THE INVENTION

1. Field of the Invention

The present invention relates to an optical scanning device and an image forming apparatus.

2. Description of the Related Art

In an electrophotographic image recording, a laser image forming apparatus is widely used. Such an image forming apparatus includes an optical scanning device, and generally forms a latent image by rotating a photosensitive drum while scanning the drum with a laser beam by a polygon scanner (for example, a polygon mirror) in an axial direction of the drum. In the electrophotographic field, the image forming apparatus is required to achieve high-density imaging to improve image quality and high-speed image output to improve operability.

To achieve both the high-density imaging and the high-speed image output, the polygon scanner can be rotated at a high speed. However, this results in the increase in noise of the polygon scanner and power consumption, and decrease in durability.

As another method of achieving both the high-density imaging and the high-speed image output, multi-beams of a light flux can be emitted from the light source. There are methods to obtain such an multi-beam as follows: (1) a method of combining a plurality of end-surface light-emitting lasers, (2) a method of using a one-dimensional array of end-surface light-emitting lasers, and (3) a method of using a two-dimensional array of a vertical-cavity surface-emitting LASERs (VCELs). Reference may be had to, for example, Japanese Patent Application Laid-open Nos. 2005-250319 and 2004-287292.

According to the method (1), cost can be decreased by using a general-purpose laser. However, it is difficult to stably hold a relative positional relationship between the coupling lens and the lasers emitting a plurality of light beams. Therefore, an interval between adjacent two scanning lines among a plurality of scanning lines formed on a scanning surface (hereinafter, "scanning-line interval") may become uneven. Further, there is a limit to the number of light sources, and there is also a limit to increase density and speed. According to the method (2), while the scanning line interval can be made uniform, there is an inconvenience that the power consumption of elements increases. When the number of light sources is considerably increased, a deviation amount of beams from the light axis of the optical system becomes large, and the beam quality may be degraded.

On the other hand, according to the method (3), less power consumption is required than that of the end-surface light-emitting laser by about one digit, and more light sources can be two-dimensionally integrated.

Japanese Patent Application Laid-open No. 2005-250319 discloses an image forming apparatus including a light source device including a plurality of sets of light sources, each having a plurality of independently modulatable light emitting points arranged two dimensionally, and a coupling lens that couples dispersion light flux emitted from the light source; an optical scanning device mounted with the light source device; and an image forming apparatus mounted with the optical scanning device.

Japanese Patent Application Laid-open No. 2004-287292 discloses an image forming apparatus mounted with an optical scanning device using a surface light-emitting laser array, and an image forming apparatus mounted with the optical scanning device.

Usually, to suppress the occurrence of uneven concentration of light on an image due to a change of light intensity following a temperature variation and a time change, the optical scanning device monitors the optical amount of the light flux emitted from the light source with a detector such as a photodiode, and performs auto power control (APC) for controlling the output level based on a monitoring result. In this case, in the end-surface light-emitting laser, light fluxes are emitted to two directions of forward and backward. Therefore, when the light flux emitted forward is used for scanning, and also when the light flux emitted backward is used for monitoring, there is no influence in the monitoring result even when the scanning light flux returns to the light source. However, because the surface light-emitting laser emits the light flux to only one direction, the emitted light flux needs to be divided or branched into two, and one of the light fluxes needs to be used for scanning and the other needs to be used for monitoring. In this case, the light flux returning to the light source may influence the monitoring result.

Recent electrophotographic image forming apparatuses, such as a digital copier, a laser printer, a laser plotter, and a laser facsimile machine, or a multifunction product (MFP) that combines any or all of the functions of these, are capable of forming color images at an increasingly high speed, and tandem color-image forming apparatuses having a plurality of (generally, four) photosensitive elements are in widespread use.

However, in the optical scanning device provided in the tandem image forming apparatus, the number of light sources increases correspondingly to photosensitive elements. Therefore, cost increases due to the increase in the number of parts, and a color shift occurs due to a wavelength difference between a plurality of light sources.

Generally, the cost of the light source in the optical scanning device is high because the light source includes a substrate for modulating a semiconductor laser. This high cost is against the cost reduction of the device and miniaturization thereof.

Degradation of the semiconductor laser used as a light source causes failure of the optical scanning device. An increase in the number of light sources may increase the risk of failure, and this is disadvantageous for recycling.

Japanese Patent Application Laid-open No. 2002-23085 discloses an example of a conventional optical scanning device that is designed to avoid increasing the number of light sources in the optical scanning device corresponding to the tandem system. The conventional optical scanning device uses a pyramidal mirror or a sheet mirror to scan different scanning surfaces with light beams from the same light source. With this, while the number of light sources can be decreased, the maximum number of surfaces of a deflection mirror is two, and this is a problem in achieving a high speed.

To solve the above problems in the conventional technology, according to an embodiment of the present invention, a deflector having a polygon mirror, with phases deviated and superimposed at two stages, is used to scan different scanning surfaces with light beams from the same light source. Japanese Patent Application Laid-open No. 2001-83452 discloses a conventional technology related to the embodiment of the present invention. However, this conventional technology has an object of increasing a scanning width, and not scanning different scanning surfaces.

Further, recent optical scanning devices for a color image forming apparatus include an oblique-incidence optical system that inputs (oblique incidence) an light beam to a deflection-reflection surface of an optical deflector at an angle in the sub-scanning direction. An example of such an optical scanning device is described in Japanese Patent Application Laid-open No. 2003-5114. With this oblique-incidence optical system, after a plurality of light beams are deflected/reflected on the deflection-reflection surface, the reflected beams are separated and led by a reflection mirror or the like to corresponding scanning surfaces of photosensitive elements. Angles of the light beams in the sub-scanning directions (angles at which the light beams are obliquely incident to the optical deflector) are set to angles at which each light flux can be separated by the mirror.

However, the oblique-incidence method causes a "scanning line curve", and an increase of variation between image heights of a beam spot diameter due to "wave aberration degradation". The occurrence amount of the scanning line curve is different depending on oblique-incidence angles of the light beams in the sub-scanning directions. When latent images formed by respective light beams are developed into toner (visible) images with toner of respective colors and superimposed, color shifts occur. Because light fluxes are incident at oblique angles, the light fluxes are twisted when incident to the scanning lens, resulting in the increase in the wave aberration. Particularly, the optical performance is considerably degraded in the peripheral image heights, and the beam spot diameter increases. As a result, this interrupts the high-image quality.

Japanese Patent Application Laid-open No. H11-14932 discloses, as a method of correcting a "large scanning-line curve" intrinsic to the oblique-incidence method, a method of including "a lens having a lens surface, with an intrinsic inclination of the lens surface in a sub-scanning cross section changed to a main scanning direction to correct a scanning line curve" in the scanning imaging optical system. Japanese Patent Application Laid-open No. H11-38348 discloses a method of including "a correction reflection surface having a reflection surface with an intrinsic inclination of the reflection surface in the sub-scanning cross section changed to a main scanning direction to correct a scanning line curve" in the scanning imaging optical system.

Japanese Patent Application Laid-open No. 2004-70109 has proposed a conventional technology in which a light flux incident at an oblique angle is passed through off-axis of the scanning lens. Scanning lines are adjusted using a surface for changing the aspherical amount of a child line of the scanning lens along the main scanning direction. According to this conventional technology, correction is performed using one scanning lens. While the scanning line curve can be corrected, degradation of the beam spot diameter due to an increase in the wave aberration is not taken into account.

Another problem of the oblique-incidence method is that a large degradation of wave aberration easily occurs at the peripheral image height (near both ends of the scanning line) due to the beam skew. When this wave aberration occurs, a spot diameter of the optical spot becomes large at the peripheral image height. That is, the diameter of beam spots varies between image heights. When this problem cannot be solved, high image quality cannot be achieved. With this conventional technology, a large scanning line curve intrinsic to the oblique-incidence method is satisfactorily corrected. However, the correction of the wave aberration cannot be said satisfactory.

Japanese Patent Application Laid-open No. H10-73778 discloses as a device capable of satisfactorily correcting "scanning line curve and degradation of wave aberration" mentioned above as problems of the oblique-incidence method, an optical scanning device that includes a plurality of rotation asymmetrical lenses in the scanning imaging optical system, in which the bus-line shape connecting between child-line tops of the lens surfaces of the rotation asymmetrical lenses is bended to the sub-scanning direction.

The lens having the "lens surface having the bus-line shape connecting between child-line tops bent to the sub-scanning direction" mentioned above solves the problems by bending the bus line. However, because individual scanning lenses corresponding to the incident light fluxes are necessary, the number of scanning lenses increases when the scanning lenses are applied to the tandem scanning optical system. That is, when a plurality of light fluxes directed to different scanning surfaces are incident to the same lens, the problems can be solved for one light flux by bending the bus-line shape; however, the scanning-line bending and wave aberration cannot be easily decreased for the other light flux.

Because light fluxes have a curvature in the sub-scanning direction, when the light fluxes incident to the same lens are deviated in the sub-scanning direction due to an assembly error, a processing error, and environmental variations, the shape of the scanning-line curve changes because of the influence of the refractive power of the lens in the sub-scanning direction. Thus, color shift cannot be avoided in an color image at the initial time (or at the design time).

In the correction of wave aberration, there is a large change in the skew state of the light flux due to the variation of the incident light flux on the surface having a curvature, and a satisfactory beam-spot diameter cannot be easily obtained stably.

In the conventional technology related to the oblique incidence method described in Japanese Patent Application Laid-open No. 2003-5114, a surface similar to that described in Japanese Patent Application Laid-open No. H10-73778 is used to correct the scanning line curve. However, as explained above, it is difficult to stably obtain a satisfactory beam spot diameter.

SUMMARY OF THE INVENTION

It is an object of the present invention to at least partially solve the problems in the conventional technology.

According to an aspect of the present invention, there is provided an optical scanning device that scans a scanning surface with light beams. The optical scanning device includes a light source that includes a plurality of surface light-emitting lasers for emitting light beams; a deflector that includes a deflection-reflection surface for deflecting the light beams from the light source; a first optical system that is arranged on an optical path of the light beams between the light source and the deflector to guide the light beams from the light source to the deflector, and includes a plate having an opening that defines a diameter of the light beams in at least a sub-scanning direction; a second optical system that guides the light beams deflected by the deflector to the scanning surface; and a monitoring optical system that monitors an amount of light beams emitted from the surface light-emitting lasers. Light beams directed from the deflector to the second optical system is inclined from a normal line of the deflection-reflection surface with respect to a sub-scanning direction.

According to another aspect of the present invention, there is provided an optical scanning device. The optical scanning device includes a light source that is driven to emit modulated light beams; a deflector that includes multiple stages of multi-faceted reflection mirrors on an identical rotation axis for deflecting the light beams from the light source; a light-dividing unit that divides the light beams from the light source, and inputs divided light beams to each of the reflection mirrors at different stages; and a scanning optical system that guides the divided light beams deflected by each of the reflection mirrors to corresponding one of a plurality of scanning surfaces to scan the scanning surface with the divided light beams. The reflection mirrors are deviated from each other in rotation direction. The divided light beams have an angle with respect to a normal line of the reflection mirror in a sub-scanning direction.

According to still another aspect of the present invention, there is provided an image forming apparatus. The image forming apparatus includes an image carrier on which a latent image is formed by electrophotography, and an optical scanning device that scans a surface of the image carrier with light beams based on image data for an exposure process in the electrophotography. The optical scanning device includes a light source that includes a plurality of surface light-emitting lasers for emitting light beams; a deflector that includes a deflection-reflection surface for deflecting the light beams from the light source; a first optical system that is arranged on an optical path of the light beams between the light source and the deflector, and guides the light beams from the light source to the deflector, the first optical system including a plate having an opening that defines a diameter of the light beams in at least a sub-scanning direction; a second optical system that guides the light beams deflected by the deflector to the scanning surface; and a monitoring optical system that monitors an amount of light beams emitted from the surface light-emitting lasers. Light beams directed from the deflector to the second optical system is inclined from a normal line of the deflection-reflection surface with respect to a sub-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a table of characteristics of the VCSEL shown in FIG. 11;

DETAILED DESCRIPTION OF THE PREFERRED EMBODIMENTS

Exemplary embodiments of the present invention are explained in detail below with reference to the accompanying drawings.

Figure 1:
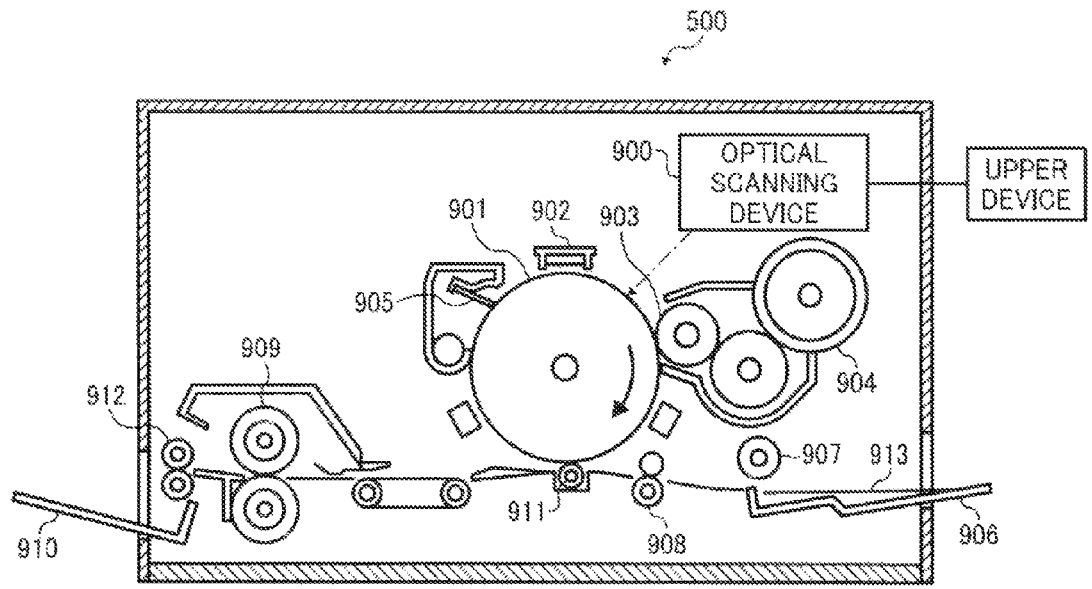
FIG. 1 is a schematic diagram of an image forming apparatus according to a first embodiment of the present invention.

FIG. 1 is a schematic diagram of a laser printer 500 as an image forming apparatus according to a first embodiment of the present invention.

The laser printer 500 includes an optical scanning device 900, a photosensitive drum 901, a charger 902, a developing roller 903, a toner cartridge 904, a cleaning blade 905, a feed tray 906, a feed roller 907, a pair of registration rollers 908, a transfer charger 911, a fixing roller 909, a discharge roller 912, and a discharge tray 910.

A photosensitive layer is formed on the surface of the photosensitive drum 901. That is, the surface of the photosensitive drum 901 is a scanning surface. The photosensitive drum 901 is assumed to rotate in an arrowhead direction in FIG. 1.

The charger 902, the developing roller 903, the transfer charger 911, and the cleaning blade 905 are arranged near the surface of the photosensitive drum 901, respectively. The charger 902, the developing roller 903, the transfer charger 911, and the cleaning blade 905 are arranged in this order in the rotation direction of the photosensitive drum 901.

The charger 902 uniformly charges the surface of the photosensitive drum 901.

The optical scanning device 900 irradiates light modulated based on image information from an upper device (such as a personal computer), onto the surface of the photosensitive drum 901 charged by the charger 902. With this arrangement, charge disappears at only a part where the light is irradiated, on the surface of the photosensitive drum 901, and a latent image corresponding to the image information is formed on the surface of the photosensitive drum 901. The formed latent image moves to a direction of the developing roller 903, following the rotation of the photosensitive drum 901. A configuration of the optical scanning device 900 is described later.

Toner is stored in the toner cartridge 904, and the toner is supplied to the developing roller 903. The amount of the toner within the toner cartridge 904 is checked when a power source is turned on or when a printing ends. When the remaining amount of the toner is small, a message urging a user to replace the toner cartridge 904 is displayed on a display unit (not shown).

The surface of the developing roller 903 is charged with the toner supplied from the toner cartridge 904, along the rotation of the developing roller 903, and the toner is uniformly adhered to the surface in a small thickness. The developing roller 903 is applied with a voltage so that electric fields of mutually different directions occur on a charged part (a part not irradiated with light) and a non-charged part (a part irradiated with light) of the photosensitive drum 901. Based on this voltage, the toner adhered to the surface of the developing roller 903 is adhered only to the light-irradiated part of the surface of the photosensitive drum 901. That is, the developing roller 903 makes the toner adhered to the latent image formed on the surface of the photosensitive drum 901, thereby developing the latent into a toner image. The toner image moves to a direction of the transfer charger 911 along the rotation of the photosensitive drum 901.

Recording sheets 913 are stored in the feed tray 906. The feed roller 907 is arranged near the feed tray 906. The feed roller 907 takes out each of the recording sheets 913 from the feed tray 906, and carries the sheet to the registration rollers 908. The registration rollers 908 is arranged near the transfer roller 911. The registration rollers 908 temporarily holds the recording sheet, and sends it to between the photosensitive drum 901 and the transfer charger 911 correspondingly to the rotation of the photosensitive drum 901.

The transfer charger 911 is applied with a voltage of a polarity opposite to that of the toner to electrically draw the toner on the surface of the photosensitive drum 901 to the sheet. Based on this voltage, the toner image on the surface of the photosensitive drum 901 is transferred onto the recording sheet. The sheet with the toner image transferred thereon is sent to the fixing roller 909.

The fixing roller 909 applies heat and pressure to the sheet, thereby fixing the toner image to the recording sheet. The sheet with the toner fixed thereon is sent to the discharge tray 910 via the discharge roller 912. In this way, sheets of the recording sheet 913 are stacked in order on the discharge tray 910.

The cleaning blade 905 removes the toner (residual toner) remaining on the surface of the photosensitive drum 901. The removed residual toner is used again. The surface of the photosensitive drum 901 from which the residual toner is removed returns to the position of the charger 902 again.

Figure 2:
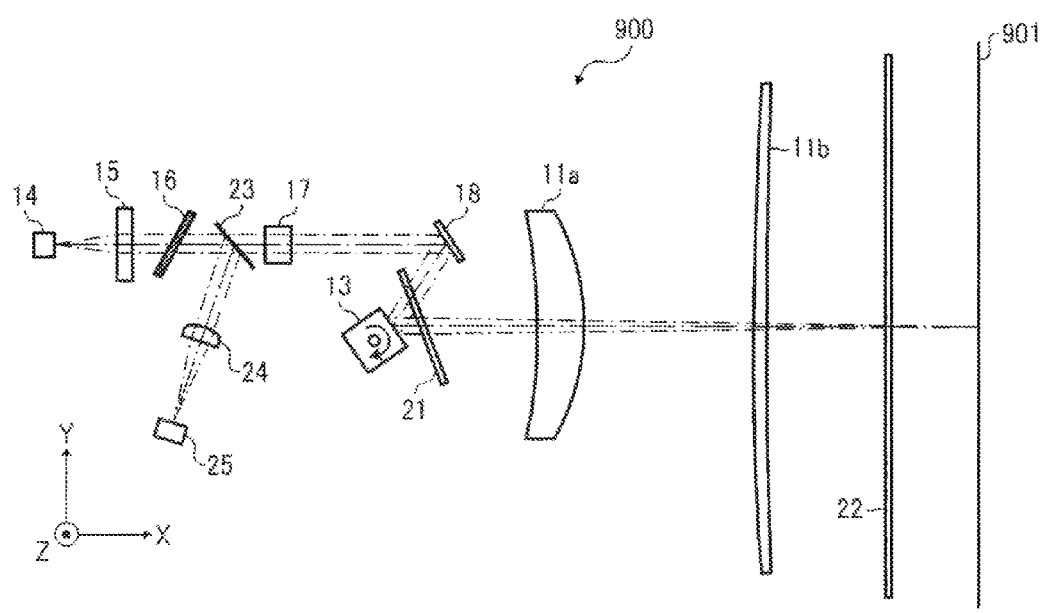
FIG. 2 is a schematic diagram of an optical scanning device shown in FIG. 1.

As shown in FIG. 2, the optical scanning device 900 includes a light source 14, a coupling lens 15, an apertured plate 16, a cylindrical lens 17, a reflection mirror 18, a polygon mirror 13, a polygon mirror (not shown) that rotates the polygon mirror 13, a deflector-side scanning lens 11a, an image-surface-side scanning lens 11b, a half mirror 23, an imaging lens 24, and a photodiode 25. In the following, a main scanning direction is described as Y-axis direction, a sub-scanning direction as Z-axis direction, and a direction crossing these directions as X-axis direction.

Figure 3:
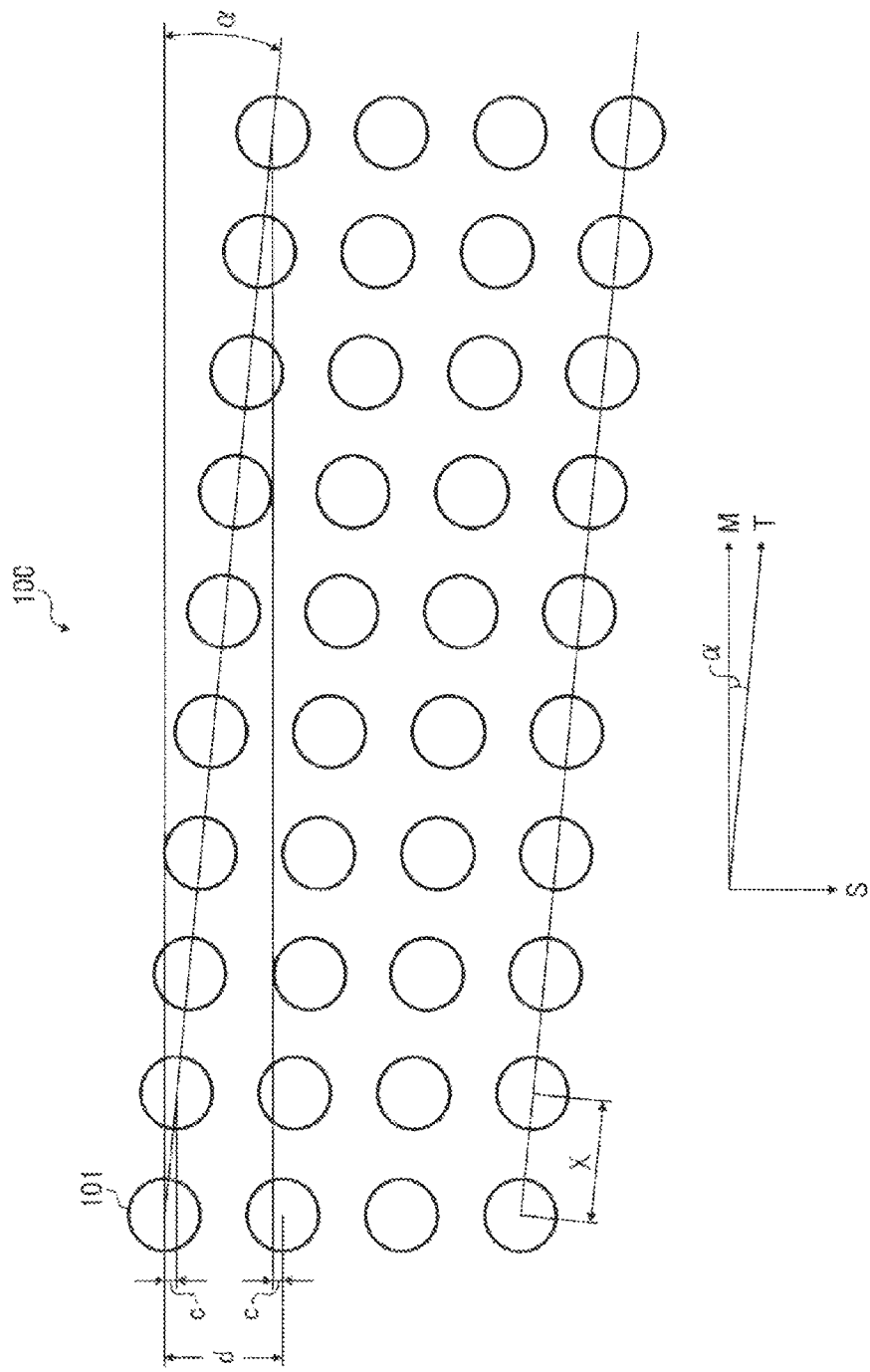
FIG. 3 is a schematic diagram for explaining a two-dimensional array of VCSELs in a light source shown in FIG. 2.

As shown in FIG. 3, the light source 14 has a two-dimensional array 100 having 40 light emitting units 101 formed on one substrate, for example. The two-dimensional array 100 has four rows of light emitting units, each row having ten light emitting units arranged at equal intervals along a direction forming an inclination angle α (T direction) from a direction corresponding to a main scanning direction (M direction) toward a direction corresponding to the sub-scanning direction (S direction). The four rows of light emitting units are arranged at equal intervals in the S direction. That is, the 40 light emitting units 101 are two-dimensionally arranged along the T direction and the S direction, respectively.

As an example, an interval of the adjacent light emitting units in the S direction (indicated by d in FIG. 3) is 44.0 micrometers. An interval of the light emitting units in the T direction (indicated by X in FIG. 3) is 30.0 micrometers. An interval of the light emitting units when the light emitting units are orthogonally projected to a virtual line extending to the S direction (indicated c in FIG. 3) is 4.4 micrometers. The term "interval of the light emitting units" as used herein refer to a distance between each center of two light emitting units.

Figure 4:
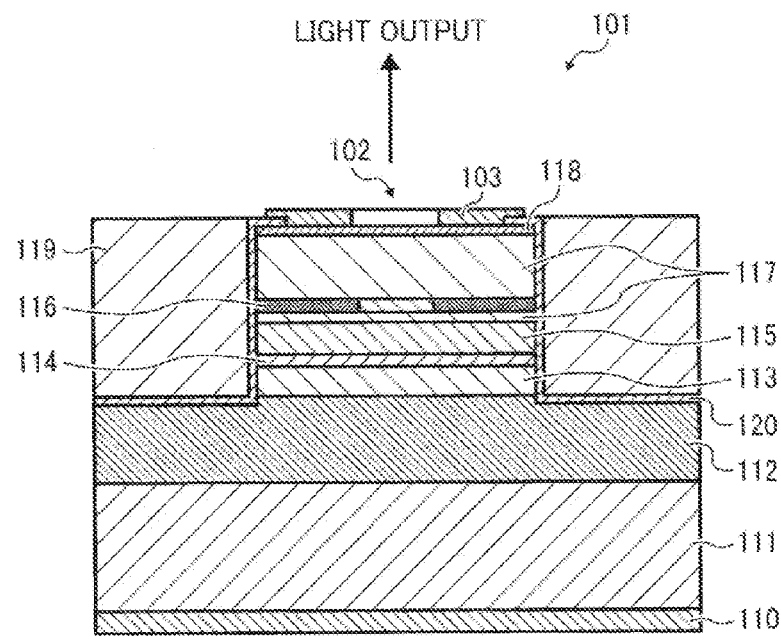
FIG. 4 is a schematic diagram of a VCSEL in the two-dimensional array shown in FIG. 3.

FIG. 4 is a schematic diagram of a VCSEL in the two-dimensional array 100. Each light emitting unit 101 is a VCSEL of a 780 nanometer band (wavelength). As shown in FIG. 4, for example, semiconductor layers such as a lower reflection mirror 112, a spacer layer 113, an active layer 114, a spacer layer 115, an upper reflection mirror 117, a p-contact layer 118 are sequentially laminated on an n-GaAs substrate 111. In addition to the semiconductor layers, on a lower electrode 110 are also arranged a light emitting unit 102, polyimide 119, and a protection layer (SiO$_2$ protection layer) 120.

Figure 5:
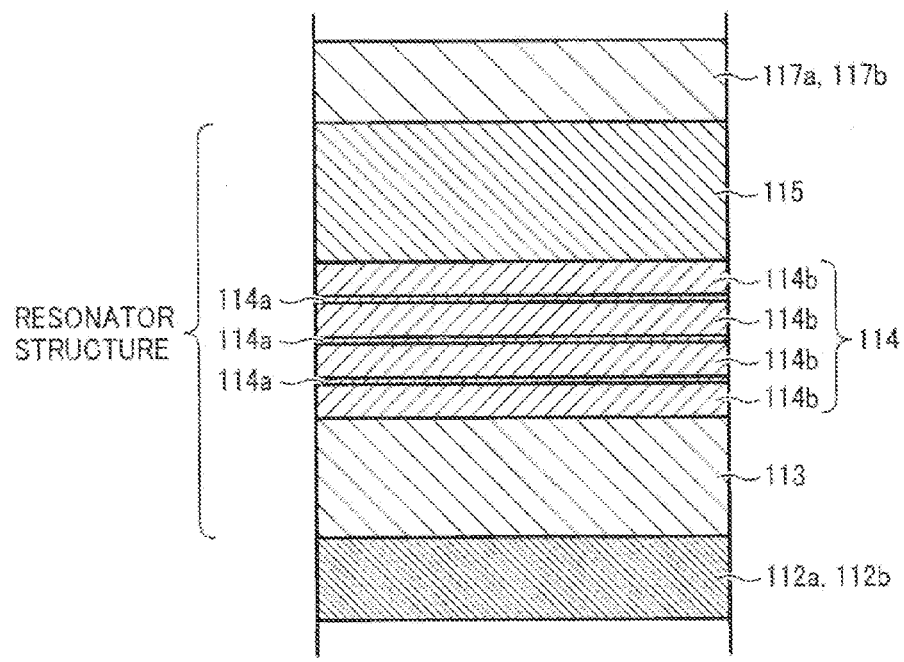
FIG. 5 is a partially-enlarged view of the VCSEL shown in FIG. 4.

A lamination of the plurality of semiconductor layers is hereinafter simply referred to as "laminate". FIG. 5 is an enlarged view of the vicinity of the active layer 114.

The lower reflection mirror 112 has 40.5 pairs of a low refractive-index layer of n-Al$_{0.9}$Ga$_{0.1}$As (a low refractive-index layer 112a), and a high refractive-index layer of n-Al$_{0.3}$Ga$_{0.7}$As (a high refractive-index layer 112b). Each refractive-index layer is set to have an optical thickness of $\lambda/4$, where $\lambda$ is an oscillation wavelength. To decrease electric resistance, a composition inclined layer (not shown) having compositions gradually changed from one component to the other component is provided, between the low refractive-index layer 112a and the high refractive-index layer 112b.

The spacer layer 113 includes $Al_{0.6}Ga_{0.4}As$.

The active layer 114 has a quantum well layer 114a including $Al_{0.12}Ga_{0.7}As$, and a barrier layer ($Ga_{0.6}In_{0.4}$ barrier layer) 114b including $Al_{0.3}Ga_{0.7}As$, as shown in FIG. 5.

The spacer layer 115 is a layer including $Al_{0.6}Ga_{0.4}As$.

A part including the spacer layer 113, the active layer 114, and the spacer layer 115 is also called a resonator structure, and a thickness of this resonator structure is set to have an optical thickness of one wavelength (wavelength λ=780 nm) (see FIG. 5).

The upper reflection mirror 117 has 24 pairs of a low refractive-index layer of p-$Al_{0.9}Ga_{0.1}As$ (a low refractive-index layer 117a), and a high refractive-index layer of p-$Al_{0.3}Ga_{0.7}As$ (a high refractive-index layer 117b). Each refractive-index layer is set to have an optical thickness of λ/4. To decrease electric resistance, a composition inclined layer (not shown) having compositions gradually changed from one component to the other component is provided, between the low refractive-index layer 117a and the high refractive-index layer 117b.

A selection oxide layer 116 including AlAs is provided at a position with a distance of λ/4 from the resonator structure in the upper reflection mirror 117.

A method of manufacturing the two-dimensional array 100 is briefly explained below.

(1) The laminate is generated by crystal growth using the metalorganic chemical vapor deposition (MOCVD) method or the molecular beam epitaxy (MBE) method.

(2) A trench that is called a mesa is formed by the dry etching method at each surrounding of a plurality of regions each becoming a light emitting unit. The etching bottom surface is set to reach the lower reflection mirror 112. The etching bottom surface is present at a position at least exceeding the selection oxide layer 116. Accordingly, the selection oxide layer 116 appears on the sidewall of the trench. A size (diameter) of the mesa is preferably equal to or larger than 10 micrometers. When the size is too small, the mesa is heated at the element operation time, and this has a risk of giving bad influence to light emission characteristics. A width of the trench is preferably equal to or larger than 5 micrometers. When the width of the trench is too small, it becomes difficult to control the etching.

(3) The laminate formed with the trench is heat treated in vapor, and a part of the selection oxide layer 116 of the mesa is selectively oxidized to be changed into an insulation layer of $Al_xO_y$. In this case, an AlAs region not oxidized in the selection oxide layer 116 remains. Accordingly, a so-called current constrictive structure that limits the route of the driving current of the light emitting unit to only the center of the mesa is formed.

(4) The $SiO_2$ protection layer 120 having a thickness of 150 nanometers is provided on the area excluding the area where an upper electrode 103 of each mesa is formed and excluding the light emitting unit 102. Further, each trench is embedded with the polyimide 119, and is flattened.

(5) The upper electrode 103 is formed in the region excluding the light emitting unit 102 on the p-contact layer 118 of each mesa, and each bonding pad (not shown) is formed on the periphery of the laminate. Each wiring (not shown) connecting between each upper electrode 103 and the corresponding boding pad is formed.

(6) The lower electrode (n-side common electrode) 110 is formed on the laminate bottom surface.

(7) The laminate is cut into a plurality of chips.

Figure 6:
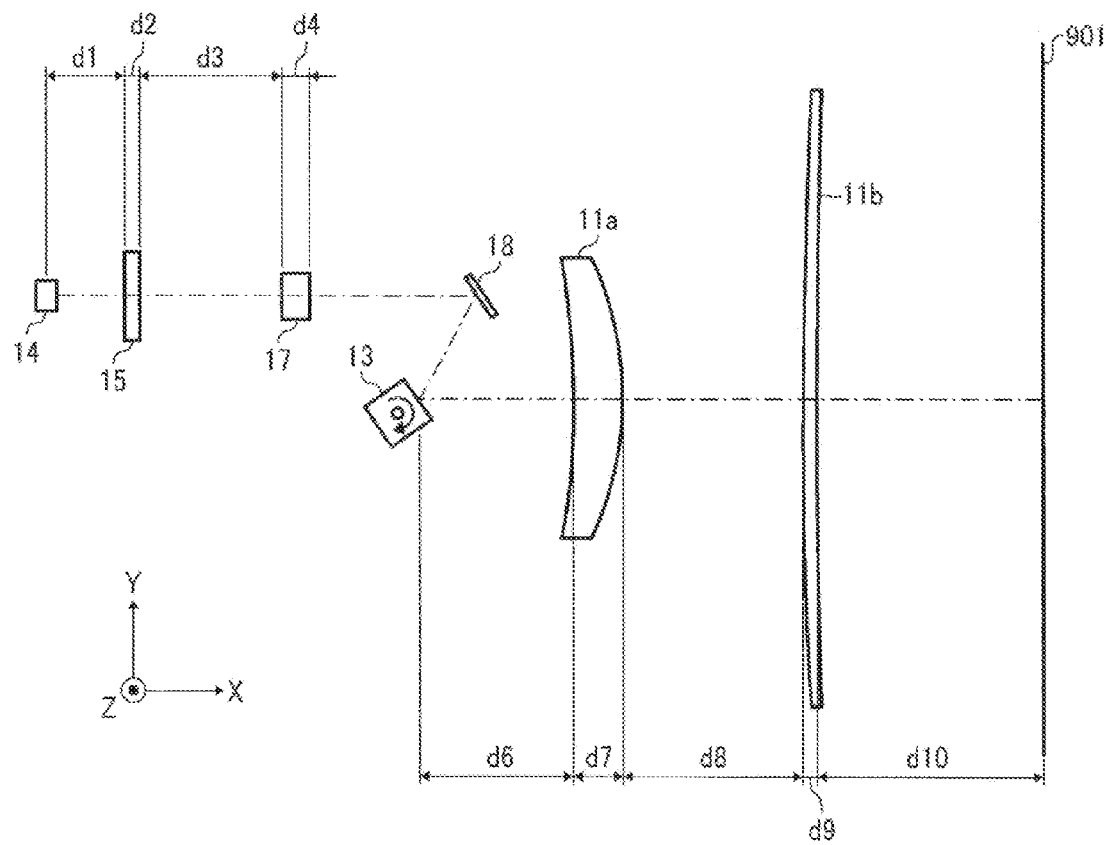
FIG. 6 is a schematic diagram for explaining a position of each optical element in the optical scanning device shown in FIG. 2.

Referring back to FIG. 2, the coupling lens 15 is arranged on the optical path of a flux of light beams emitted from the light source 14, and the light beams emitted are set as approximately parallel beams. The coupling lens 15 is arranged at a position of an optical length (indicated by d1 in FIG. 6) of 39.305 millimeters from the light source 14, for example. A thickness (indicated by d2 in FIG. 6) of the coupling lens 15 is 3.8 millimeters, for example. A focal distance of the coupling lens 15 is 42.0 millimeters.

The light source 14 and the coupling lens 15 are held by a holding member made of aluminum. A cover glass having a refractive index 1.5112 and a thickness 0.3 millimeter is arranged between the light source 14 and the coupling lens 15.

The apertured plate 16 is arranged on the optical path between the coupling lens 15 and the cylindrical lens 17, and has an aperture that defines a beam diameter in at least the sub-scanning direction of the light flux via the coupling lens 15. The apertured plate 16 is arranged with an inclination to a virtual surface perpendicular to a proceeding direction of a light flux directed toward the polygon mirror 13 from the light source 14. With this arrangement, returning of light reflected from the surrounding of the aperture to the light source 14 can be prevented. The apertured plate 16 is arranged to shield the light flux reflected from the polygon mirror 13 and directed to the light source.

The half mirror is arranged on the optical path between the apertured plate 16 and the cylindrical lens 17, and reflects a part of the light flux passing through the aperture of the apertured plate 16. A ratio of the transmission-light amount (intensity) to the reflection-light amount on the half mirror 23 is set to any one of 9:1, 8:2, and 7:3.

The cylindrical lens 17 is arranged on the optical path between the half mirror 23 and the reflection mirror 18, and forms an image of the light flux passing through the half mirror 23 in the sub-scanning direction near the deflection-reflection surface of the polygon mirror 13 via the reflection mirror 18. The cylindrical lens 17 is arranged at a position of the optical path length (indicated by d3 in FIG. 6) of 79.3 millimeters from the second surface of the coupling lens 15, for example. A thickness (indicated by d4 in FIG. 6) of the cylindrical lens 17 is 3.0 millimeters, for example.

A soundproof glass 21 having a thickness 1.9 millimeters and a refractive index 1.5112 is arranged between the cylindrical lens 17 and the polygon mirror 13, and between the polygon mirror 13 and the deflector-side scanning lens 11a (see FIG. 2).

The polygon mirror 13 is a tetrahedron mirror having a radius of an inscribed circle 7 millimeters, and each mirror is a deflection-reflection surface, as an example. This polygon mirror 13 rotates at an equal speed around the rotation axis parallel with the sub-scanning direction. As an example, the polygon mirror 13 is arranged at a position of an optical path length 51.8 millimeters from the second surface of the cylindrical lens 17 to the rotation axis.

The deflector-side scanning lens 11a is arranged on the optical path of the light flux deflected by the polygon mirror 13. As an example, the deflector-side scanning lens 11a is arranged at a position of an optical path length (indicated by d6 in FIG. 6) of 46.3 millimeters from the rotation axis of the polygon mirror 13 to the first surface of the deflector-side scanning lens 11a. A center (on the optical axis) thickness (indicated by d7 in FIG. 6) of the deflector-side scanning lens 11a is 13.5 millimeters.

The image-surface-side scanning lens 11b is arranged on the optical path of the light flux via the deflector-side scanning lens 11a. As an example, the image-surface-side scanning lens 11*b* is arranged at a position of an optical path length (indicated by d8 in FIG. 6) of 89.7 millimeters from the second surface of the deflector-side scanning lens 11*a* to the first surface of the image-surface-side scanning lens 11*b*. A center (on the optical axis) thickness (indicated by d9 in FIG. 6) of the image-surface-side scanning lens 11*b* is 3.5 millimeters.

As an example, the optical scanning device 900 is arranged so that the optical path length (indicated by d10 in FIG. 6) from the second surface of the image-surface-side scanning lens 11*b* to the photosensitive drum 901 becomes 142.5 millimeters. A dustproof glass 22 (see FIG. 2) having a refractive index 1.5112 and a thickness 1.9 millimeters is arranged between the image-surface-side scanning lens 11*b* and the photosensitive drum 901.

Figure 7:
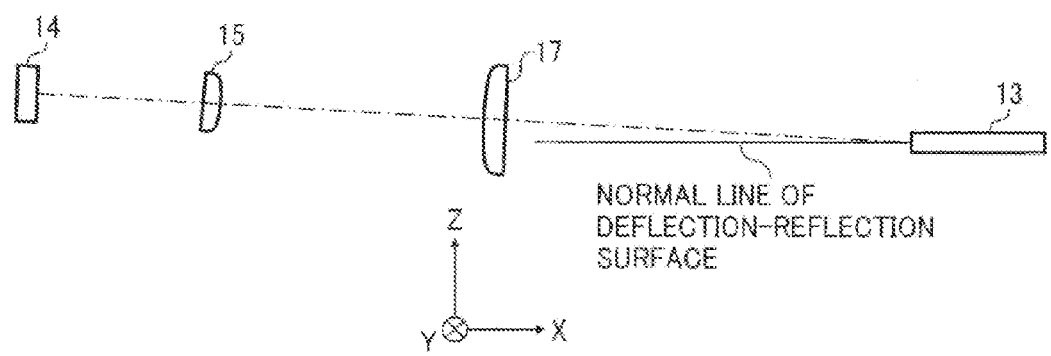
FIG. 7 is a schematic diagram for explaining a relationship between a direction in which a light flux incident to a polygon mirror and a normal line direction of a deflection-reflection surface of the polygon mirror relative to a sub-scanning direction.
Figure 8A:
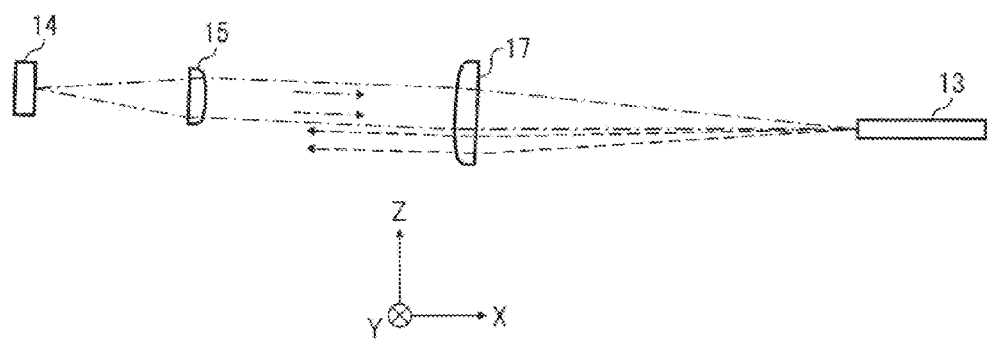
FIGS. 8A and 8B are schematic diagrams for explaining a relationship between a direction in which a light flux incident to the polygon mirror and light returning from the polygon mirror.
Figure 8B:
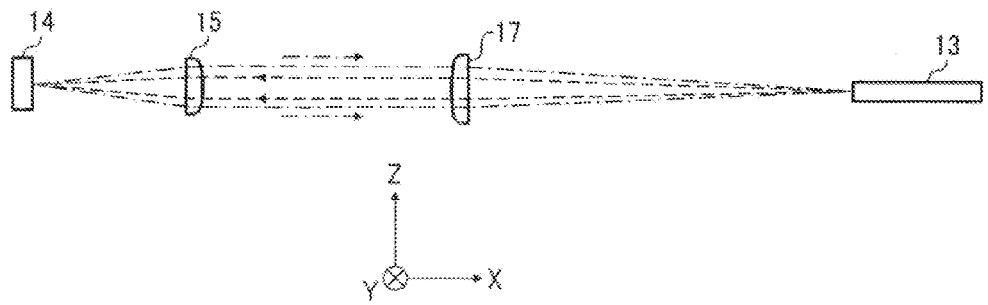

As shown in FIG. 7, for example, the optical axis of the coupling lens 15 and the cylindrical lens 17 is arranged with an inclination to the normal line direction of the deflection-reflection surface of the polygon mirror 13, relative to the sub-scanning direction. Accordingly, as shown in FIG. 8A, for example, the light flux emitted from the light source 14 is incident to the deflection-reflection surface with an inclination to the normal line direction of the deflection-reflection surface, relative to the sub-scanning direction. In this case, the returning of the light flux reflected from the deflection-reflection surface to the light source side can be suppressed. FIG. 8B is an example that the optical axis of the coupling lens 15 and the cylindrical lens 17 is arranged to coincide with the normal direction of the deflection-reflection surface. In this case, the light flux emitted from the light source 14 is incident to the deflection-reflection surface parallel with the normal line direction of the deflection-reflection surface, and this has a risk that the light flux reflected from the deflection-reflection surface returns to the light source side.

Figure 9:
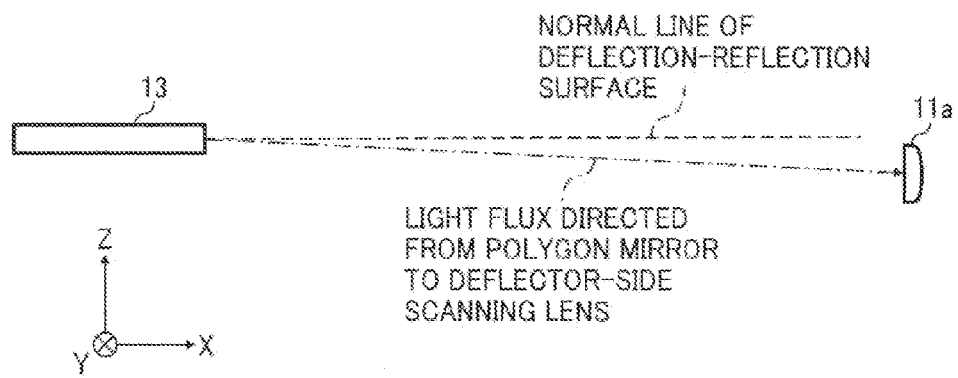
FIG. 9 is a schematic diagram for explaining a light flux directed from a polygon mirror to a scanning lens on a deflector side relative to the sub-scanning direction.

As shown in FIG. 9, for example, the light flux directed from the polygon mirror 13 to the deflector-side scanning lens 11*a* is inclined in the normal line direction of the deflection-reflection surface relative to the sub-scanning direction.

Referring back to FIG. 2, the imaging lens 24 focuses the light flux reflected from the half mirror 23. The photodiode 25 is arranged near the focusing position, and outputs a signal (photoelectric conversion signal) corresponding to the light receiving amount. The output signal of the photodiode 25 is used to monitor the amount (intensity) of the light flux emitted from each light emitting unit, and the driving current of each light emitting unit is corrected based on a monitoring result.

In the optical scanning device 900, a first optical system includes the coupling lens 15, the apertured plate 16, the cylindrical lens 17, and the reflection mirror 18. A second optical system includes the deflector-side scanning lens 11*a* and the image-surface-side scanning lens 11*b*. A monitoring device includes the half mirror 23, the imaging lens 24, and the photodiode 25.

As explained above, the optical scanning device 900 includes the light source 14 having a plurality of surface light-emitting lasers, the polygon mirror 13 that deflects the light flux from the light source 14, the first optical system which is arranged on the optical path between the light source 14 and the polygon mirror 13 and leads the light flux from the light source 14 to the polygon mirror 13, the second optical system that leads the light flux deflected by the polygon mirror 13 to the photosensitive drum 901, and the monitoring device that monitors the amount (intensity) of the light flux emitted from each light emitting unit. The optical axis of the coupling lens 15 and the cylindrical lens 17 is arranged with an inclination to the normal line direction of the deflection-reflection surface, relative to the sub-scanning direction. Therefore, the light flux emitted from the light source 14 is incident to the deflection-reflection surface with an inclination to the normal line direction of the deflection-reflection surface, relative to the sub-scanning direction. Accordingly, returning of the light flux reflected from the deflection-reflection surface to the light source side can be suppressed. Consequently, the amount of the light flux emitted from each light emitting unit of the light source can be monitored with high precision. As a result, the scanning surface can be stably scanned by the light flux.

The apertured plate 16 is arranged with an inclination to the virtual surface perpendicular to the proceeding direction of the light flux directed to the polygon mirror 13 from the light source 14. Therefore, the light reflected from the surrounding of the aperture can be prevented from returning to the light source 14 side. With this arrangement, the amount of the light flux emitted from each light emitting unit of the light source can be monitored in higher precision.

The apertured plate 16 shields the light flux reflected from the polygon mirror 13 and directed to the light source side. Therefore, the light flux reflected from the polygon mirror 13 can be more prevented from returning to the light source side. When the light flux is incident to the light emitting unit, resonance characteristics change, and amount of the emitted light changes. However, this change can be prevented.

Figure 10:
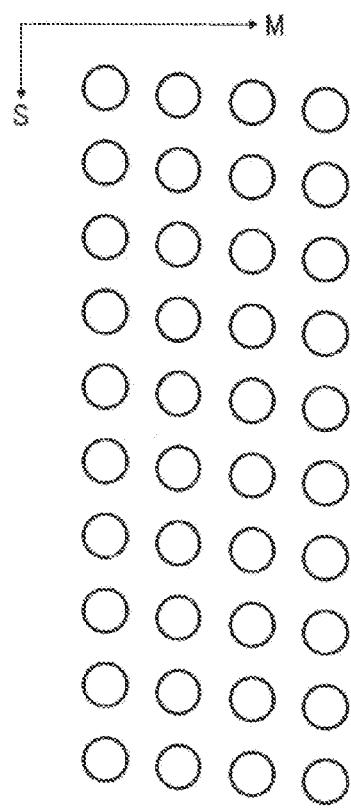
FIG. 10 is a schematic diagram for explaining two-dimensional arrays to be compared.

A plurality of light emitting units are arranged two dimensionally, and the interval between two light emitting units located at both ends in the direction corresponding to the main scanning direction is larger than the interval between two light emitting units located at both ends in the direction corresponding to the sub-scanning direction. Therefore, as compared with the opposite case (FIG. 10, for example), the inclination of the optical axis of the coupling lens 15 and the cylindrical lens 17 can be set freely to some extent.

A method of increasing the writing density in the sub-scanning direction using a multibeam light source includes (1) a method of decreasing a lateral magnification in the sub-scanning direction of the optical system including the first optical system and the second optical system, and (2) a method of decreasing the interval of the light emitting units in the sub-scanning direction (indicated by c in FIG. 3). However, according to the method of (1), in the apertured plate that defines the beam diameter on the scanning surface, a width of the aperture in the sub-scanning direction needs to be set small, and this results in shortage of light amount (intensity). On the other hand, according to the method of (2), there is an influence of heat interference between the light emitting units, and it becomes difficult to secure space necessary to pass wirings from the light emitting units.

A plurality of light emitting units are arranged two dimensionally, and the interval between two light emitting units located at both ends in the direction corresponding to the main scanning direction is larger than the interval between two light emitting units located at both ends in the direction corresponding to the sub-scanning direction. Therefore, the interval between the light emitting units in the sub-scanning direction can be made smaller, while decreasing the influence of heat interference between the light emitting units and securing space necessary to pass the wirings of the light emitting units.

The laser printer 500 includes the optical scanning device 900 capable of stably scanning the scanning surface by the light flux. As a result, a high-quality image can be formed at a high speed.

While, in the first embodiment, each mesa of the two-dimensional array 100 has a circular shape, each mesa can be of an arbitrary shape such as an elliptical shape, a square shape, and a rectangular shape.

While, in the first embodiment, the number of light emitting units constituting one row of light emitting units is ten and the number of rows of light emitting units is four, the numbers are not so limited. Preferably, a plurality of light emitting units are arranged two dimensionally, and the interval between two light emitting units located at both ends in the direction corresponding to the main scanning direction is larger than the interval between two light emitting units located at both ends in the direction corresponding to the sub-scanning direction.

While, in the first embodiment, the interval c between the light emitting units is explained as 4.4 micrometers, the value of the interval c is cited by way of example and without limitation.

While, in the first embodiment, the interval d between the light emitting units is explained as 44.0 micrometers and the interval X between the light emitting units is explained as 30.0 micrometers, the value of the interval d and the interval X is also cited by way of example and without limitation.

Figure 11:
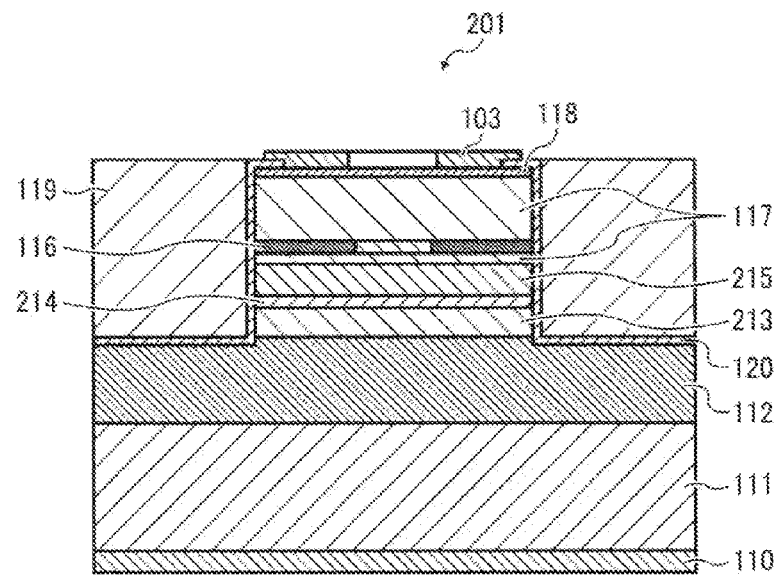
FIG. 11 is a schematic diagram for explaining a modification of a VCSEL.
Figure 12:
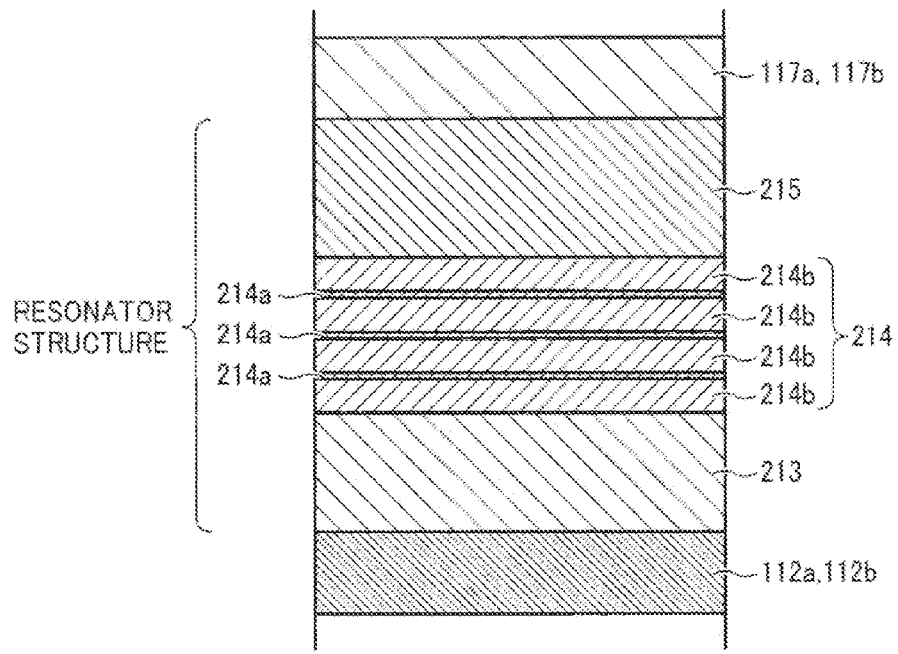
FIG. 12 is a partially-enlarged view of the VCSEL shown in FIG. 11.

As shown in FIGS. 11 to 13, for example, a two-dimensional array 200 having a material of part of the plurality of semiconductor layers of the two-dimensional array 100 can be used in place of the two-dimensional array 100. With the two-dimensional array 200, the spacer layer 113 of the two-dimensional array 100 is replaced by a spacer layer 213, the active layer 114 is replaced by an active layer 214, and the spacer layer 115 is replaced by a spacer layer 215.

The spacer layer 213 includes $(Al_{0.7}Ga_{0.3})_{0.5}In_{0.5}$ as a wideband gap.

As shown in FIG. 12, the active layer 214 is a component having a compressive distortion remaining, and includes a three-layer GaInPAs quantum-well layer 214a having a bandgap wavelength 780 nanometers, and the $Ga_{0.6}In_{0.4}$ barrier layer 214b having a tensile distortion of a layer of lattice matching.

The space layer 215 includes $(Al_{0.7}Ga_{0.3})_{0.5}In_{0.5}P$ as a wideband gap layer.

A part including the spacer layer 213, the active layer 214, and the spacer layer 215 is called a resonator structure, and their thicknesses are set to a one-wavelength optical thickness (see FIG. 12).

The two-dimensional array 200 uses a material of the AlGaInP system in the spacer layer. Therefore, a bandgap difference between the spacer layer and the active layer can be taken remarkably larger than that of the AlGaInP system.

FIG. 13 is a table showing a bandgap difference between the spacer layer and the quantum well layer of a representative material component and a bandgap difference between the barrier layer and the quantum well layer, for a VCSEL having an AlGaAs/AlGaAs system as the material of the spacer layer/quantum well layer and having a wavelength of a 780 nanometer band (hereinafter, "VCSEL_A"), for a VCSEL having an AlGaInP/GaInPAs system as the material of the spacer layer/quantum well layer and having a wavelength of a 780 nanometer band (hereinafter, "VCSEL_B"), and for a VCSEL having an AlGaAs/GaAs system as the material of the spacer layer/quantum well layer and having a wavelength of a 850 nanometer band (hereinafter, "VCSEL_C"). VCSEL_A corresponds to the VCSEL 101 of the two-dimensional array, and when x=0.7, VCSEL_B corresponds to VCSEL (VCSELL 201 in the two-dimensional array 200.

According to this, it can be understood that VCSEL_B can take a larger bandgap difference than that of VCSEL_A and VCSEL_C, respectively. Specifically, a bandgap difference between the spacer layer and the quantum well layer of VCSEL_B is 67.3 mega-electron volts (meV), and this is considerably larger than 465.0 meV of VCSEL_A. Similarly, regarding a bandgap difference between the barrier layer and the quantum well layer, VCSEL_B has priority, and a carrier can be closed more satisfactorily.

The VCSEL 201 has a compressive distortion in the quantum well layer. Therefore, the increase of gain becomes large by the band separation between a heavy hole and a light hole, and a high output becomes possible at a threshold value because of high gain. Accordingly, a reflection rate of the reflection mirror at the light taking-out side (the upper reflection mirror 117 in this case) becomes possible, and a higher output can be achieved. Because high gain can be obtained, a reduction in the optical output due to a temperature rise can be suppressed, and the interval between the VCSELs in the two-dimensional array can be made smaller.

The VCSEL 201 includes a material not including aluminum (Al), in each of the quantum-well layer 214a and the barrier layer 214b. Therefore, taking in of oxygen into the active layer 214 can be decreased. As a result, formation of a non-light-emitting coupling center can be suppressed, thereby further increasing the life.

When a two-dimensional array of VCSELs is used for a so-called writing optical unit, the writing optical unit becomes a throwaway. However, the VCSEL 201 has a long life as described above. Therefore, the writing optical unit using the two-dimensional array 200 can be used again. Accordingly, resource protection can be promoted, and environmental load can be decreased. This can be similarly applied to other devices using a two-dimensional array of VCSELs.

In the first embodiment, it is explained that the laser beam emitted from each light emitting unit has a 780 nanometer band. However, the wavelength is not limited to this, and the laser beam can have a wavelength corresponding to sensitivity characteristics of the photosensitive drum 901. In this case, at least part of the material constituting each light emitting unit, or at least part of the configuration of each light emitting unit is changed correspondingly to the oscillation wavelength.

While the laser printer 500 is explained as the image forming apparatus of the first embodiment, the image forming apparatus is not necessarily a laser printer. That is, any image forming apparatus including the optical scanning device 900 can form a high-quality image at a high speed.

An image forming apparatus that forms a multi-color image can also form a high-quality image at a high speed, using an optical scanning device corresponding to the color image.

Figure 14:
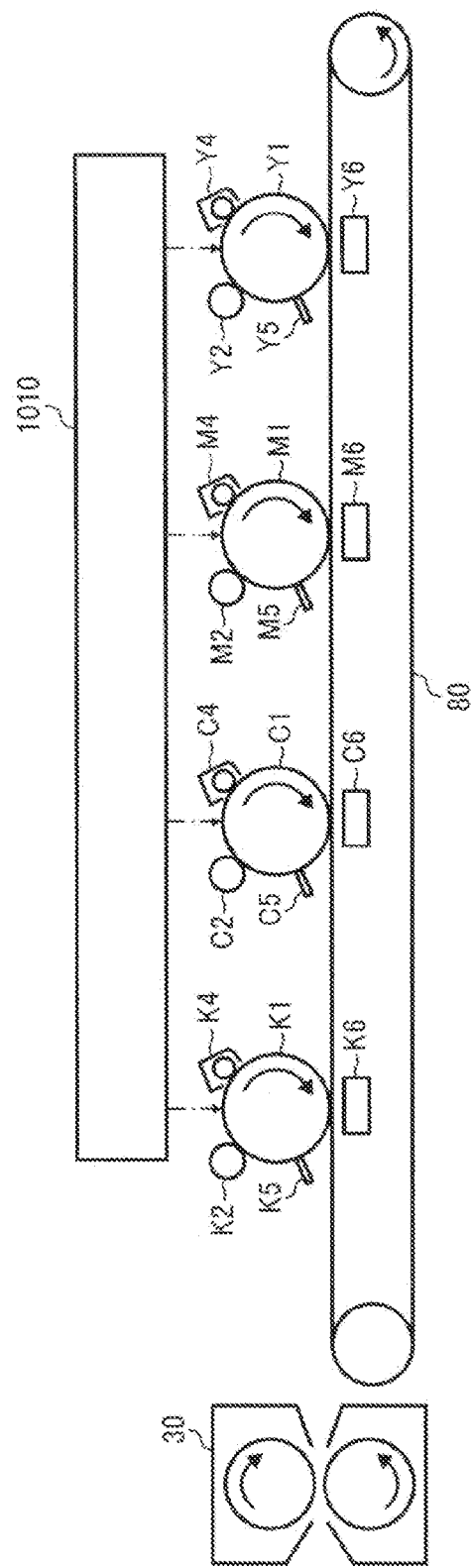
FIG. 14 is a schematic diagram of a tandem color image forming apparatus.

In this case, as shown in FIG. 14, for example, a tandem color machine including a plurality of photosensitive drums can be used. This tandem color machine includes a photosensitive drum K1, a charger K2, a developer K4, a cleaning unit K5, and a transfer charging unit K6 for black (K), respectively, a photosensitive drum C1, a charger C2, a developer C4, a cleaning unit C5, and a transfer charging unit C6 for cyan (C), respectively, a photosensitive drum M1, a charger M2, a developer M4, a cleaning unit M5, and a transfer charging unit M6 for magenta (M), respectively, and a photosensitive drum Y1, a charger Y2, a developer Y4, a cleaning unit Y5, and a transfer charging unit Y6 for black (K), respectively, an optical scanning device 1010, a transfer belt 80, and a fixing unit 30.

Figure 15:
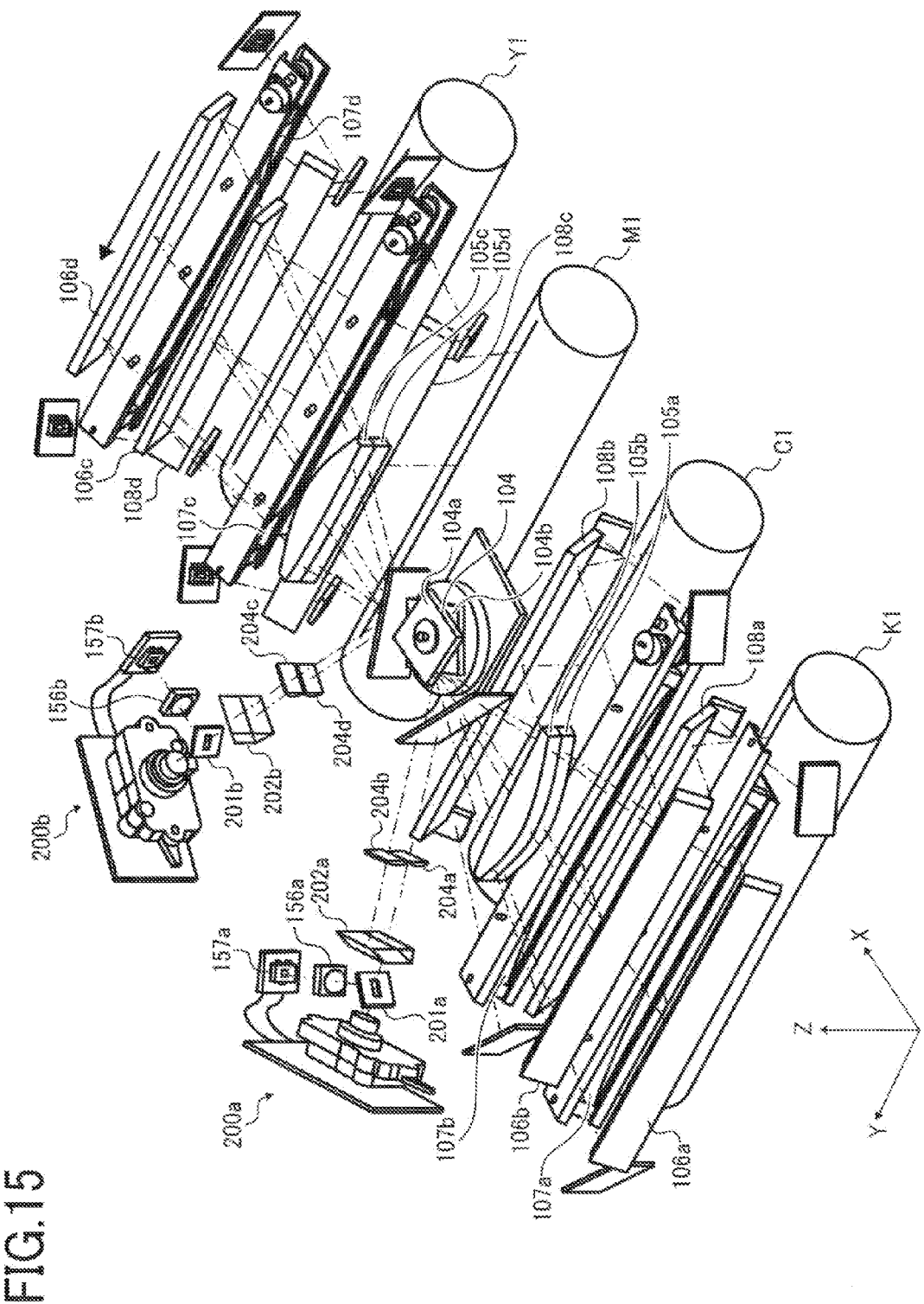
FIG. 15 is a schematic diagram of an optical scanning device according to a second embodiment of the present invention.

As shown in FIG. 15, for example, the optical scanning device 1010 includes two light sources (200a, 200b), two apertured plates (201a, 201b), two light-dividing prisms (202a, 202b), four cylindrical lenses (204a, 204b, 204c, 204d), a polygon mirror 104, four fθ lenses (105a, 105b, 105c, 105d), eight reflection mirrors (106a, 106b, 106c, 106d, 108a, 108b, 108c, 108d), four toroidal lenses (107a, 107b, 107c, 107d), two converging lenses (156a, 156b), and two light-receiving elements (157a, 157b).

Each light source includes a light source having the two-dimensional array 100 or the two-dimensional array 200, and a coupling lens.

The apertured plate 201a has an aperture, and prescribes a beam diameter of a beam from the light source 200a. The apertured plate 201b has an aperture, and prescribes a beam diameter of a beam from the light source 200b. Each apertured plate is used to monitor the light reflected from the surrounding of the aperture, and is arranged with an inclination to the corresponding light source. With this arrangement, the returning of light reflected from the surrounding of the aperture to the light source can be prevented.

The light-dividing prism 202a divides the light passing through the aperture of the apertured plate 201a into mutually parallel two beams at a predetermined interval to the Z axis direction. The light-dividing prism 202b divides the light passing through the aperture of the apertured plate 201b into mutually parallel two beams at a predetermined interval to the Z axis direction.

The cylindrical lens 204a is arranged on the optical path of the light at the −Z side (hereinafter, also "black light") out of the two beams from the light-dividing prism 202a, and converges this black light in the sub-scanning direction near the deflection-reflection surface of the polygon mirror 104.

The cylindrical lens 204b is arranged on the optical path of the light at the +Z side (hereinafter, also "cyan light") out of the two beams from the light-dividing prism 202a, and converges this black light in the sub-scanning direction near the deflection-reflection surface of the polygon mirror 104.

The cylindrical lens 204c is arranged on the optical path of the light at the +Z side (hereinafter, also "magenta light") out of the two beams from the light-dividing prism 202b, and converges this black light in the sub-scanning direction near the deflection-reflection surface of the polygon mirror 104.

The cylindrical lens 204d is arranged on the optical path of the light at the −Z side (hereinafter, "yellow light") out of the two beams from the light-dividing prism 202b, and converges this black light in the sub-scanning direction near the deflection-reflection surface of the polygon mirror 104.

The polygon mirror 104 has a two-stage four-surface mirror, and each mirror becomes a deflection-reflection surface. A first-stage (lower-stage) deflection-reflection surface deflects the light from the cylindrical lens 204a and the light from the cylindrical lens 204d, respectively, and a second-stage (upper-stage) deflection-reflection surface deflects the light from the cylindrical lens 204b and the light from the cylindrical lens 204c, respectively. The first-stage deflection-reflection surface and the second-stage deflection-reflection surface are rotated with mutual phases deviated by 45°, and light scanning is performed alternately at the first stage and the second stage.

The fθ lens 105a and the fθ lens 105b are arranged at the −X side of the polygon mirror 104, and the fθ lens 105c and the fθ lens 105d are arranged at the +X side of the polygon mirror 104.

The fθ lens 105a and the fθ lens 105b are laminated in the Z axis direction. The fθ lens 105a faces the first-stage deflection-reflection surface, and the fθ lens 105b faces the second-stage deflection-reflection surface. The fθ lens 105c and the fθ lens 105d are laminated in the Z axis direction. The fθ lens 105c faces the second-stage deflection-reflection surface, and the fθ lens 105d faces the first-stage deflection-reflection surface.

The black light deflected from the polygon mirror 104 is incident to the fθ lens 105a. The yellow light is incident to the fθ lens 105d, the cyan light is incident to the fθ lens 105b, and the magenta light is incident to the fθ lens 105c.

Figure 16A:
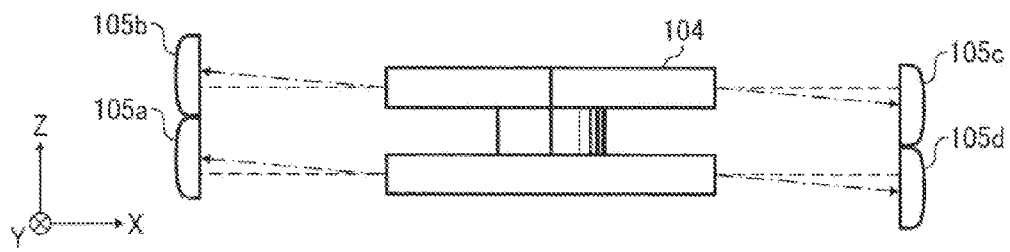
FIGS. 16A to 16D are schematic diagrams for explaining a light flux directed from a polygon mirror to each fθ lens.
Figure 16B:
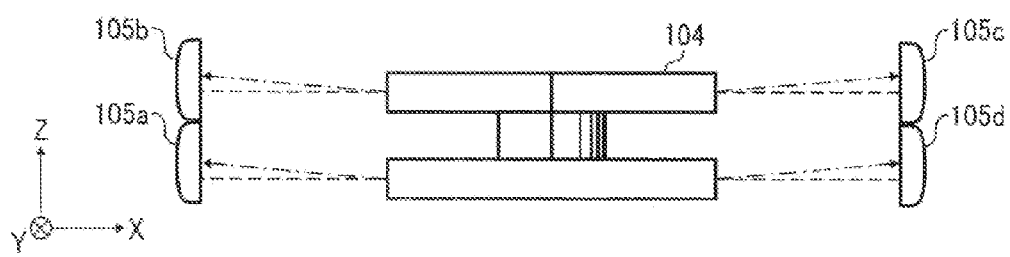
Figure 16C:
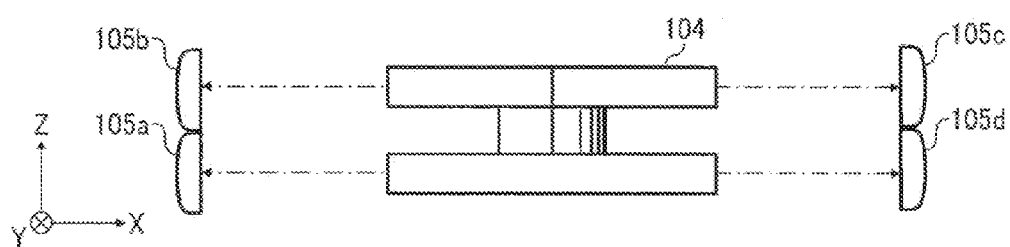
Figure 16D:
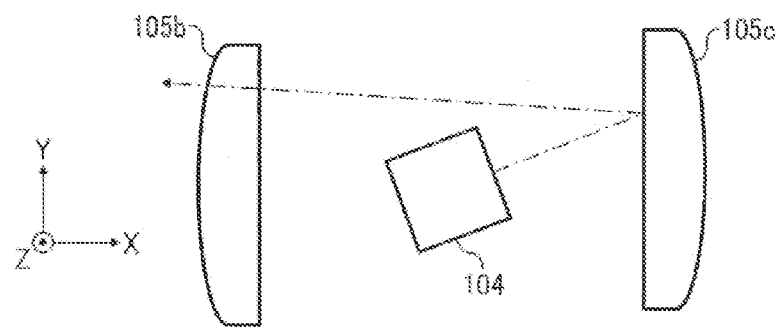

In the optical scanning device 1010, as shown in FIG. 16A, for example, the light flux directed from the polygon mirror 104 to the fθ lens 105a or the fθ lens 105b is inclined to the +Z side in the normal direction of the deflection-reflection surface of the polygon mirror 104, relative to the sub-scanning direction, and the light flux directed from the polygon mirror 104 to the fθ lens 105c or the fθ lens 105d is inclined to the −Z side in the normal direction of the deflection-reflection surface of the polygon mirror 104, relative to the sub-scanning direction. As shown in FIG. 16B, for example, when the light flux directed from the polygon mirror 104 to the fθ lens 105c or the fθ lens 105d is inclined to the +Z side in the normal direction of the deflection-reflection surface of the polygon mirror 104, relative to the sub-scanning direction, and as shown in FIG. 16C, for example, when the light flux directed from the polygon mirror 104 to each fθ lens coincides with the normal direction of the deflection-reflection surface of the polygon mirror 104, relative to the sub-scanning direction, there is a risk that, as shown in FIG. 16D, for example, the reflection light from one of the fθ lenses arranged to sandwich the polygon mirror 104 is incident to the other fθ lens as a flare light.

The black light passing through the fθ lens 105a is focused to form an image in a spot shape on the photosensitive drum K1 via the reflection mirror 106a, the toroidal lens 107a, and the reflection mirror 108a.

The cyan light passing through the fθ lens 105b is focused to form an image in a spot shape on the photosensitive drum C1 via the reflection mirror 106b, the toroidal lens 107b, and the reflection mirror 108b.

The magenta light passing through the fθ lens 105c is focused to form an image in a spot shape on the photosensitive drum M1 via the reflection mirror 106c, the toroidal lens 107c, and the reflection mirror 108c.

The yellow light passing through the fθ lens 105d is focused to form an image in a spot shape on the photosensitive drum Y1 via the reflection mirror 106d, the toroidal lens 107d, and the reflection mirror 108d.

Figure 17A:
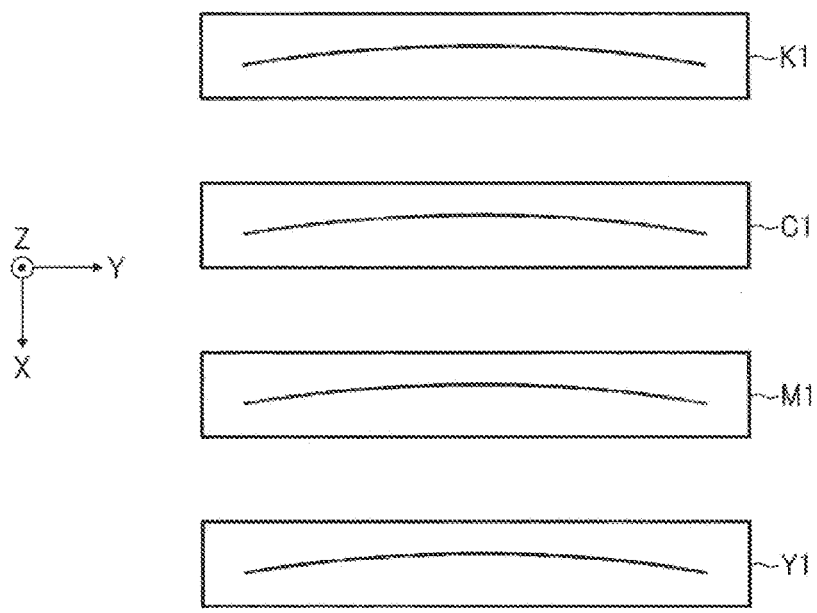
FIGS. 17A and 17B are schematic diagrams for explaining a curve of a scanning line.
Figure 17B:
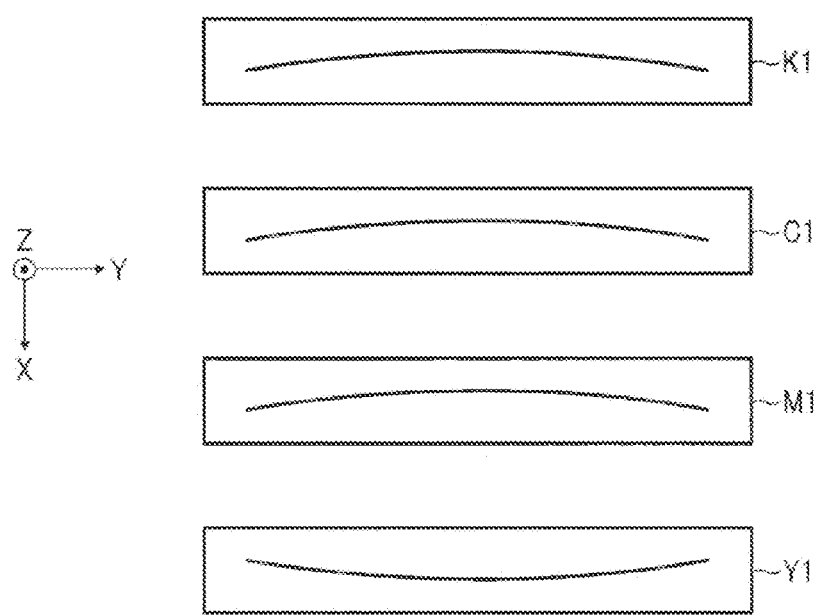

In the optical scanning device 1010, the number of reflection mirrors that bend the optical path of the light flux directed toward the photosensitive drum K1 is two, the number of reflection mirrors that bend the optical path of the light flux directed toward the photosensitive drum C1 is two, the number of reflection mirrors that bend the optical path of the light flux directed toward the photosensitive drum M1 is two, and the number of reflection mirrors that bend the optical path of the light flux directed toward the photosensitive drum Y1 is two, respectively. That is, a difference between the numbers of the reflection mirrors provided corresponding to each photosensitive drum is an even number. Accordingly, as shown in FIG. 17A, for example, the bending direction of the scanning line each photosensitive drum becomes the same direction, thereby easily decreasing a color shift. When a difference between the number of the reflection mirrors provided corresponding to the photosensitive drum Y1 and the number of the reflection mirrors provided corresponding to other three photosensitive drums is one, for example, the bending directions of the scanning lines in the photosensitive drums become opposite as shown in FIG. 17B, for example, which is likely to cause color shifts.

The converging lens 156a is arranged on the optical path of the light reflected by the apertured plate 201a, and converges the light reflected by the apertured plate 201a. The converging lens 156b is arranged on the optical path of the light reflected by the apertured plate 201b, and converges the light reflected by the apertured plate 201b.

The light receiving element 157a is arranged at a focusing position of the light via the converging lens 156a, and receives the light via the converging lens 156a. The light receiving element 157b is arranged at a focusing position of the light via the converging lens 156b, and receives the light via the converging lens 156b.

Each light receiving element outputs a signal (photoelectric conversion signal) corresponding to the received light amount (intensity).

As is clear from the above explanations, in the optical scanning device 1010, the first optical system includes each coupling lens, each apertured plate, and each cylindrical lens 17.

The second optical system includes each fθ lens, each toroidal lens, and each reflection mirror.

The monitoring device includes each apertured plate, each converging lens, and each light receiving element.

The image carrier can be an image forming apparatus using a silver salt film. In this case, a latent image is formed on the silver salt film by optical scanning, and this latent image can be visualized in the same process as the developing process in the normal silver salt photographic process. The image can be transferred onto a sheet in the same process as the printing process in the normal silver salt photographic process. This image forming apparatus can be implemented as an optical image forming apparatus and an optical drawing apparatus that draws a computer tomography (CT) scan image and the like.

The mage forming apparatus can employ, as an image carrier, a light emitting medium (positive printing plate) that generates light with heat energy of a beam spot. In this case, a visible image can be formed on the image carrier by optical scanning.

As explained above, the optical scanning device of the first embodiment is suitable for stably scanning the scanning surface by the light flux. The image forming apparatus of the first embodiment is also suitable to form a high-quality image at a high speed.

FIG. 15 is a schematic diagram of an optical scanning device according to a second embodiment of the present invention.

Example 1

Figure 21A:
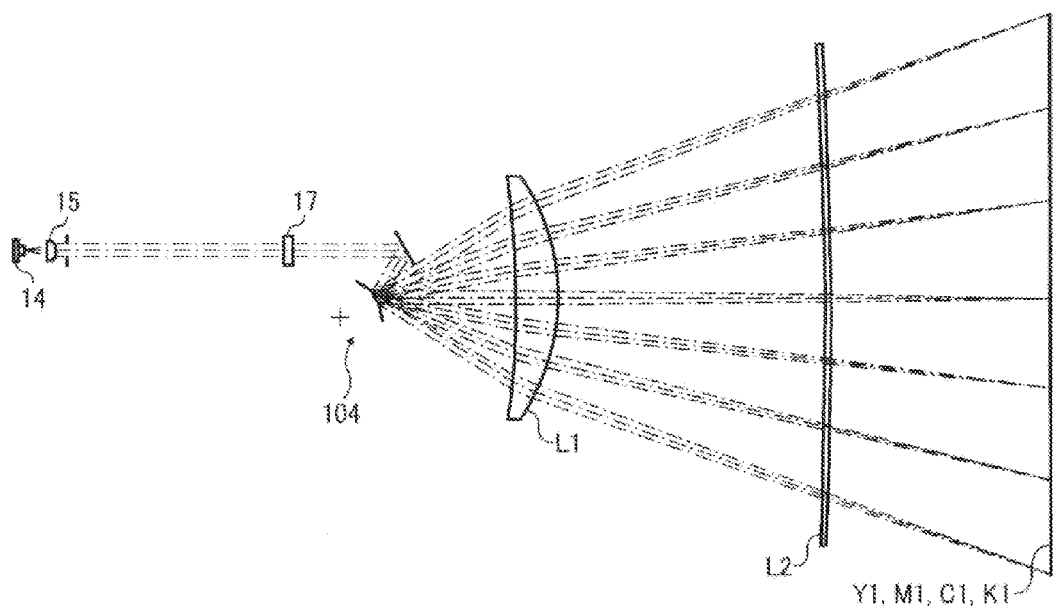
FIGS. 21A and 21B are schematic diagrams for explaining a case that an oblique-incidence optical system is used in an optical scanning device of a one-side scanning system.
Figure 21B:
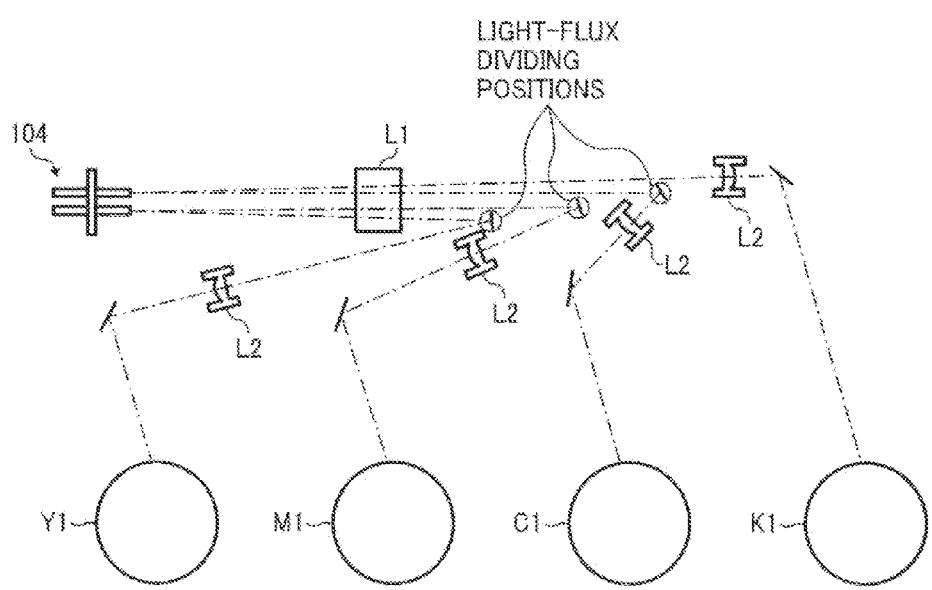
Figure 25A:
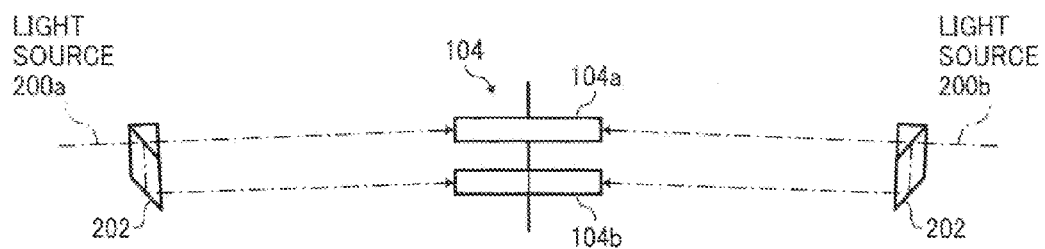
FIGS. 25A and 25B are schematic diagrams for explaining a case that an oblique-incidence optical system and a light-dividing unit are used in an optical scanning device of a counter scanning system.
Figure 25B:
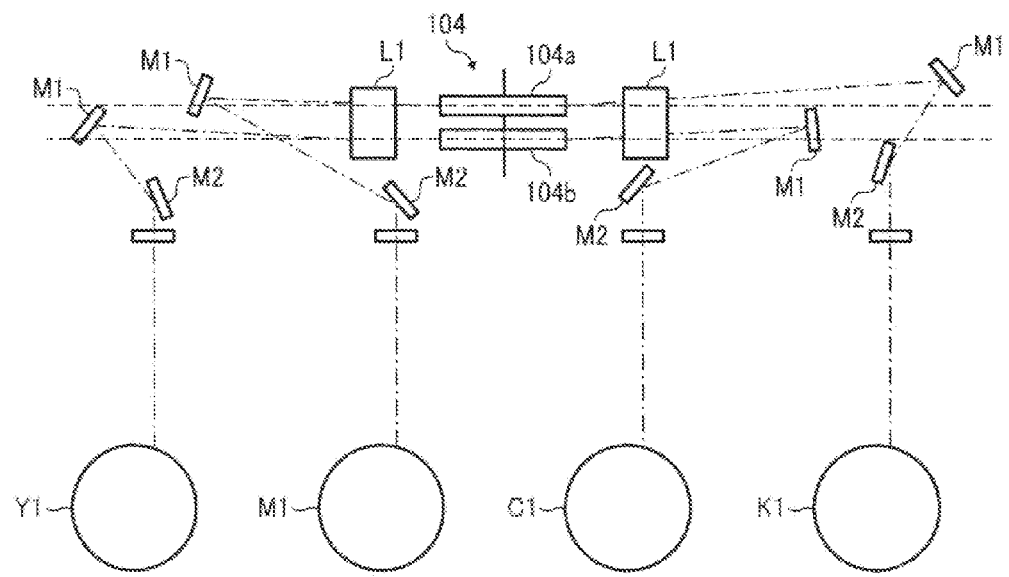

When the optical scanning device is mounted on the tandem image forming apparatus, the four photosensitive drums Y1, M1, C1, and K1 are arranged as the scanning surfaces, and there are also four scanning optical systems, as shown in FIG. 21A or 25B. FIG. 21B is an example of the one-side scanning system; FIG. 25 is an example of a counter scanning system.

Figure 18A:
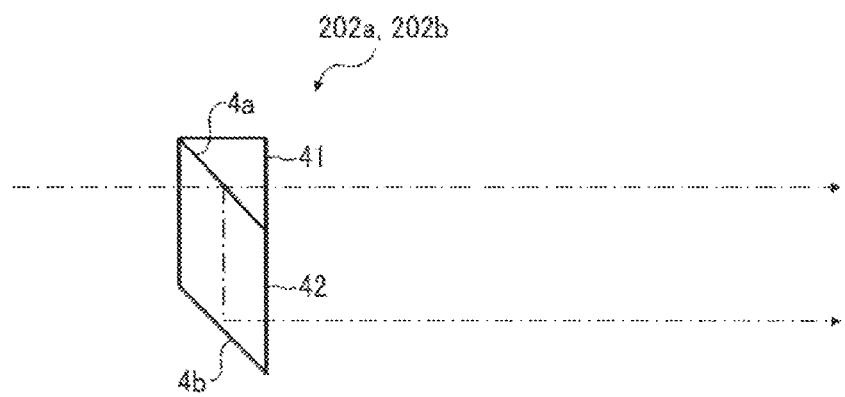
FIGS. 18A and 18B are schematic diagrams for explaining an example of a light-dividing unit (a half mirror prism)
Figure 18B:
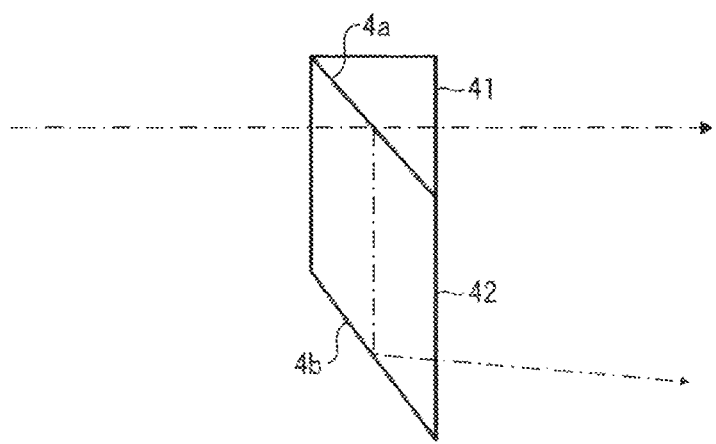

FIG. 18A is a sub-scanning cross-sectional view of the light-dividing prisms (half-mirror prisms) 202a and 202b as an example of the light-dividing unit. The half-mirror prisms 202a and 202b (hereinafter, sometimes simply denoted by 202) each includes a part 41 having a triangular cross section, and a parallelogram part 42. A contact surface 4a between the parts 41 and 42 is a half mirror, and the half mirror separates the transmission light and the reflection light at a rate of 1:1. A surface 4b facing the contact surface 4a of the parallelogram part 42 is a total reflection surface, and has a function of converting the direction of the light beam. In this case, while the half-mirror prisms 202a and 202b are used as light-dividing units, a similar system can be also configured using a single half mirror and a normal mirror. The half mirror does not need to be divided at 1:1, and can be also set to match conditions of other optical system. The parallelogram part 42 can also have a quadrangle other than the parallelogram. For example, the parallelogram part 42 can have a shape (shape having an inclination angle of the half-mirror surface 4a and an inclination angle of the total reflection surface 4b differentiated from each other) as shown in FIG. 18B, and angles of sub-scanning directions of the divided light fluxes at the time of emission from the light-dividing unit can be optionally differentiated. Effect of this is explained later.

In FIG. 15, the cylindrical lenses 204a, 204b, 204c, and 204d arranged in the upper and lower stages convert the light beams emitted from the half-mirror prisms 202, into line images that are long in the main scanning direction near the deflection-reflection surface. The optical deflector 104 has single polygon mirrors 104a and 104b arranged concentrically in the upper and the lower stages, respectively, with mutual angles in the rotation direction deviated by a predetermined angle θ. Both polygon mirrors 104a and 104b have the same shapes, and in principle, includes a polygon having an arbitrary number of surface (while the example shown in FIG. 15 has a quadrangle, the shape is not limited to the quadrangle). A vertex of the other quadrangle is superimposed on the vertex of one quadrangle at an angle to substantially equally divide the center angle of one side of the one polygon into two. When the vertex of the other polygon adjacent in the clockwise direction is looked at from the vertex of each polygon, and when the center angles between both vertexes are $\phi$, $\phi'$ (where $0<\phi\leq\phi'$), a relationship of $\phi=\phi'$ is obtained, when both polygons are symmetrically arranged relative to an arbitrary vertex. Practically, a four-surface polygon mirror can be used most easily. Therefore, the four-surface polygon mirror has a relationship of $\phi=\phi'=45$ degrees. The $\phi$ and $\phi'$ are called deviation angles. The upper-stage and the lower-stage polygon mirrors 104a and 104b can be integrally formed, or separately formed, or combined together.

Figure 19A:
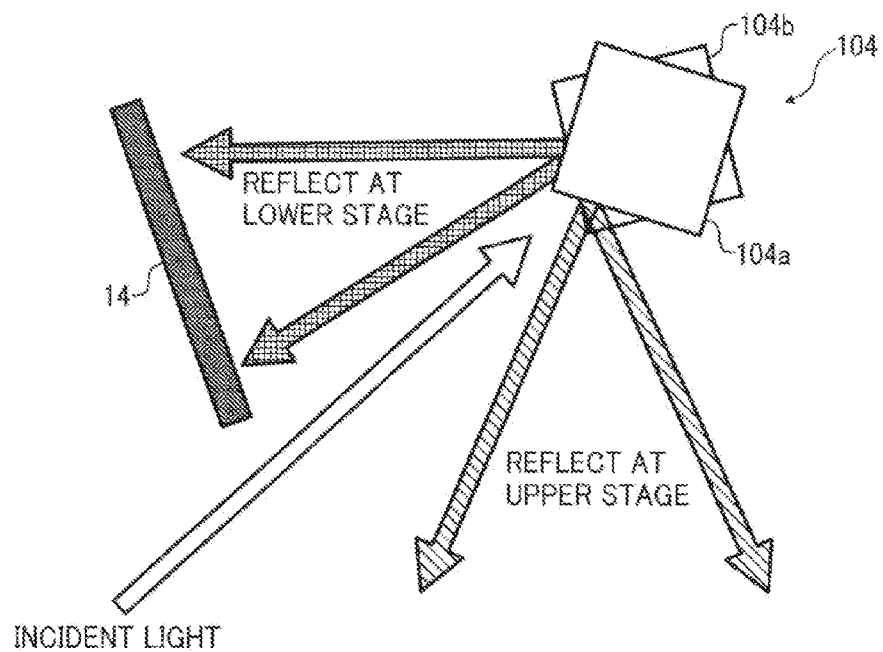
FIGS. 19A and 19B are schematic diagrams for explaining optical scanning by optical deflectors (two-stage polygon mirrors) of the optical scanning device shown in FIG. 14.
Figure 19B:
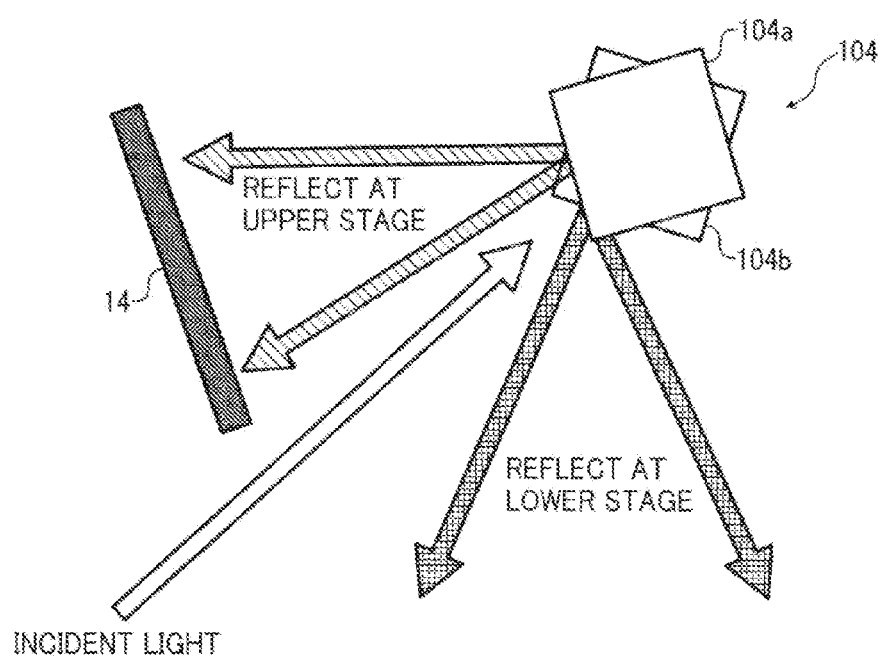

FIGS. 19A and 19B are schematic diagrams for explaining optical scanning by the two-stage polygon mirrors 104a and 104b. As shown in FIG. 19A, when the light beam incident from a common light source and reflected from the upper-stage polygon mirror 104a scans the photosensitive drum as a scanning surface, the light beam reflected from the lower-stage polygon mirror 104b is set not to reach the scanning surface, and is preferably shielded by a shielding member 50. As shown in FIG. 19B, when the light beam incident from a common light source and reflected from the lower-stage polygon mirror 104b scans the photosensitive drum, the light beam reflected from the upper-stage polygon mirror 104a is set not to reach the scanning surface, and is preferably shielded by the shielding member 50. Timings of modulation driving are also deviated by the upper-stage polygon mirror 104a and the lower-stage polygon mirror 104b. When scanning the photosensitive drum corresponding to the upper-stage polygon mirror 104a, modulation driving of the light source is performed, based on image information of a color (for example, black) corresponding to the upper-stage polygon mirror 104a. When scanning the photosensitive drum corresponding to the lower-stage polygon mirror 104b, modulation driving of the light source is performed, based on image information of a color (for example, magenta) corresponding to the lower-stage polygon mirror 104b.

Figure 20:
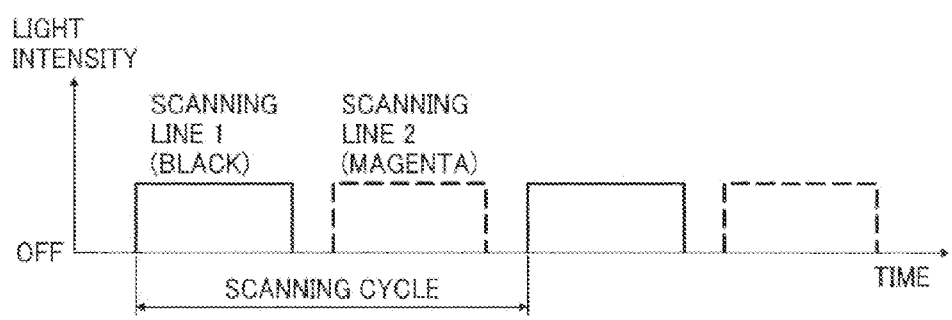
FIG. 20 is a timing chart of an example of timing of multicolor exposure.

FIG. 20 is a timing chart of an example of timing of multicolor exposure. In FIG. 20, a vertical axis represents light amount (intensity) and a lateral axis represent time, and timing is given of exposure to black and magenta lights using a common light source and performing full lighting in valid scanning regions. A solid line represents part corresponding to black, and a dotted ling represents part corresponding to magenta. Write timing of black and magenta are determined by detecting a scanning beam with a light receiving unit (not shown in FIG. 20) for detecting synchronization arranged off the valid scanning width of the photosensitive element. As the light receiving unit, a photodiode and the like can be used.

Usually, the semiconductor laser used for the image forming apparatus performs a light-intensity automatic control (Auto Power Control, hereinafter, "APC"), thereby stabilizing the light output. The APC is a system of monitoring a light output from a semiconductor laser with a light receiving element, and controlling a forward-direction current of the semiconductor laser to a desired value based on a detection signal of a light-receiving current proportional to the light output from the semiconductor laser.

When the semiconductor laser is an end-surface light-emitting semiconductor laser, the light-receiving element uses in many cases a photodiode that monitors light emitted to a direction opposite to the direction of emitting toward the coupling lens. However, when unnecessary ghost light is incident at the time of performing the APC, the light intensity detected by the light-receiving element increases. For example, when the incidence angle of the light beam to the upper-stage polygon mirror 104a is 0, the reflection surface of the polygon mirror 104a faces the light source direction. Therefore, when the APC is performed at this position, the reflection beam of the upper-stage polygon mirror 104 returns to the light source, and the light intensity detected by the light-receiving element increases. Consequently, the laser output from the lower-stage polygon mirror 104b that performs the writing has a weaker light-emitting output than intended, and the image concentration becomes low, and a concentration variation occurs. Similarly, when the incidence angle of the light beam to the lower-stage polygon mirror 104b is 0, the laser output from the upper-stage polygon mirror 104a generates a similar problem.

The light beams divided by the common light sources (200a or 200b: see FIG. 15) have angles in the respective sub-scanning directions relative to the normal lines of the polygon reflection mirrors (polygon mirrors) 104a and 104b, thereby solving the above problems. All the light beams incident to the polygon mirrors 104a and 104b have angles in the respective sub-scanning directions relative to the normal lines of the polygon mirrors 104a and 104b. With this arrangement, even when the incidence angle of the light beam to the upper-stage polygon mirror 104a is 0, the reflection beam from the upper-stage polygon mirror 104a does not return to the light source, and becomes far with a distance in the sub-scanning direction. Therefore, the light intensity detected by the light-receiving element does not increase, and there occur no problems that the laser output from the lower-stage polygon mirror 104b performing the writing has a weaker light-emitting output than intended, the image concentration becomes low, and a concentration variation occurs.

Similarly, when the incidence angle of the light beam to the lower-stage reflection mirror (polygon mirror) 104b is 0, the laser output from the upper-stage reflection mirror (polygon mirror) 104a does not return to the light source, and the light intensity detected by the light-receiving element is stabilized. The image concentration does not become weak, or the concentration variation does not occur.

Example 2

Problems arising on the optical performance when the inclined incidence system (inputting light at an angle in the sub-scanning direction relative to the normal line of the polygon mirrors 104a and 104b) is used is explained below.

In the conventional method of inputting light with inclination to the sub-scanning direction relative to the horizontal incidence has a problem that "the scanning curve" is large. The occurrence amount of this scanning curve is different depending on the inclined incidence angle in the sub-scanning direction of each light beam. When a latent image drawn with each light beam is superimposed on toner of each color to make the image visible, a color shift occurs. When the light beam is input with inclination, the light flux is input to the scanning lens with a twist. Therefore, wave aberration increases, and optical performance is degraded considerably in the peripheral image height. A beam spot diameter increases, and this becomes a factor of interrupting high image quality.

The occurrence of the scanning line curve in the inclined incidence optical system is explained with reference to FIGS. 21A and 21B. For example, when the incidence surface in the main scanning direction of the scanning lens constituting the scanning optical system, particularly the scanning lens (a second scanning lens L2 in FIGS. 21A and 21B) having strong refractive power in the sub-scanning direction does not have an arc shape around the reflection point of the light beam on the deflection-reflection surface of the optical deflector (polygon mirror) 104, a distance from the deflection-reflection surface of the optical deflector is different depending on the lens height in the main scanning direction. Usually, setting the scanning lens to have the shape described above is difficult to maintain the optical performance. That is, as shown in FIGS. 21A and 21B, the optical deflector 104 deflects the normal light beams, and inputs beams at a certain incidence angle in the main scanning direction, without perpendicularly inputting the beams to the lens surface, in the main scanning cross surface at each image height (FIG. 21A). As shown in FIG. 21A, because the light beam has an angle in the sub-scanning direction (incident with inclination), each light beam deflected/reflected from the optical deflector 104 has a different distance from the deflection-reflection surface of the optical deflector 104 to the scanning lens incidence surface depending on the image height. When the incidence height to the scanning lens in the sub-scanning direction is at the periphery, the beam is incident to a higher position than the center, or a lower position (different depending on the angle in the sub-scanning direction of the light beam). As a result, when the beam passes through the surface having refractive power in the sub-scanning direction, the refractive power receiving in the sub-scanning direction is different, and the scanning line is curved. According to the normal horizontal incidence, even when a distance from the deflection-reflection surface to the scanning lens incidence surface is different, the light beam proceeds horizontally to the scanning lens. Therefore, the incidence position of the light beam on the scanning lens in the sub-scanning direction is not different, and the scanning line is not curved. FIGS. 21A and 21B depict only a general scanning optical system, and do not depict the light-dividing prism.

The wave aberration degradation in the inclined incidence optical system is explained next. As explained above, when the incidence surface in the main scanning direction of the scanning lens constituting the scanning optical system does not have an arc shape around the reflection point of the light beam on the deflection-reflection surface, a distance from the deflection-reflection surface of the optical deflector 104 to the incidence surface of the scanning lens is different depending in the image height. Usually, setting the scanning lens to have the shape is difficult to maintain the optical performance. That is, the optical deflector 104 deflects the normal light beams, and inputs beams at a certain incidence angle in the main scanning direction, without perpendicularly inputting the beams to the lens surface, in the main scanning cross surface at each image height.

The light flux of the light beam deflected/reflected from the optical deflector 104 has a width in the main scanning direction. Light beams at both ends of the light flux in the main scanning direction have different distances from the deflection-reflection surface of the optical deflector 104 to the scanning lens incidence surface, and have angles in the sub-scanning directions (because of the incidence with inclination). Therefore, these light beams at both ends are incident to the scanning lens in the twisted state. As a result, the wave aberration is degraded considerably, and the beam spot diameter increases. As shown in FIG. 21A, the incidence angle in the main scanning direction becomes acute toward the peripheral image height, and the incidence positions of the light beams at both ends of the light flux in the main scanning direction to the scanning lens in the sub-scanning direction are deviated on a large scale. Therefore, the twist of the light flux becomes large, and the beam spot diameter becomes large due to the degradation of the wave aberration toward the periphery.

The wave aberration correction is performed on a special surface that makes large at the incidence time the angle in the sub-scanning direction of the light flux incident to the scanning lens toward the periphery of the main scanning direction.

As an example of the special surface, one surface of a common lens (a first scanning lens L1 in FIGS. 21A and 21B) is explained. This surface has different curvatures in the sub-scanning directions corresponding to the main scanning direction, and has strong negative refractive power toward the periphery of the same surface in the main scanning direction.

As explained above, the incidence angle of the scanning lens in the main scanning direction becomes acute toward the peripheral image height, and the twist of the light flux becomes large, and the beam spot diameter becomes large due to the degradation of the wave aberration toward the periphery image height. Large degradation of the wave aberration occurs due to the twist of the light flux, particularly at the time of incidence to the scanning lens having strong refractive power in the sub-scanning direction. To correct the wave aberration, the incidence height to the scanning lens having strong refractive power in the sub-scanning direction is increased, and the beam needs to be focused at one point on the scanning surface. For this purpose, it is desirable to provide the special surface to be used to correct the wave aberration, on the lens of the optical deflector (the first scanning lens L1 in FIGS. 21A and 21B) instead of on the scanning lens (the second scanning lens L2 in FIGS. 21A and 21B) having the strongest refractive power in the sub-scanning direction. When the surrounding light beams are tipped up with the first scanning lens L1, and are incident at a high position of the second scanning lens L2, degradation of the wave aberration (twist of the light flux) can be corrected, and each light beam (within the same light flux) can be focused on the scanning surface 11.

The special surface of the first scanning lens L1 is expressed by the following shape expression. This special surface has different curvatures in the sub-scanning directions corresponding to the main scanning direction, and has strong negative refractive power toward the periphery of the same surface in the main scanning direction. However, the content of this invention is not limited to the following shape expression, and the same surface shape can be also specified using a separate shape expression.

The surface shape of the special surface of the first scanning lens L1 can be expressed by the following shape expression, when a paraxial curvature radius within the "main-scanning cross section" as a flat cross section parallel with the main scanning direction including an optical axis is RY, a distance in the main scanning direction from the optical axis is Y, high coefficients are A, B, C, D, . . . , and a paraxial curvature radius within the "sub-scanning cross section" orthogonal with the main scanning cross section is RZ.

$$X(Y,Z) = Y^2 \cdot Cm / \{1 + \sqrt{[1-(1+K)-(Y \cdot Cm)^2]}\} + A \cdot Y^4 + B \cdot Y^6 + C \cdot Y^8 + D \cdot Y^{10} + E \cdot Y^{12} + \ldots + (Cs(Y) \cdot Z^2) / \{1 + \sqrt{[1-Cs(Y) \cdot (Z)^2]}\}$$

where, $$Cm = 1/RY$$

$$Cs(Y) = 1/RZ + a \cdot Y + b \cdot Y^2 + c \cdot Y^3 + d \cdot Y^4 + e \cdot Y^5 + f \cdot Y^6 + g \cdot Y^7 + h \cdot Y^8 + i \cdot Y^9 + j \cdot Y^{10} + \ldots$$

As described above, the special surface is used for the first scanning lens L1. This special surface has different curvatures in the sub-scanning directions corresponding to the main scanning direction, and has strong negative refractive power toward the periphery of the same surface in the main scanning direction. The transmitted light beam faces the periphery in the main scanning direction, and the light beam can be tipped up to the sub-scanning direction. As a result, as explained above, the incidence height in the sub-scanning direction to the second scanning lens L2 having strong refractive power in the sub-scanning direction can be adjusted, and the wave aberration can be corrected satisfactorily.

As described above, when the wave aberration correction is performed by changing the incidence position of the light beam to the second scanning lens L2, in the configuration that the light beam passes on the optical axis (reference axis) of the special surface, only the image focusing position changes, and the incidence height in the sub-scanning direction to the second scanning lens L2 is difficult. When the light beam is passed off the reference axis by using a curvature change of the sub-scanning direction to the main scanning direction of the special surface, the route of the light beam can be deflected.

The common lens used for the first scanning lens L1 is explained next. The advantage of using the common lens for the first scanning lens L1 is that the number of scanning lenses can be decreased and a low-cost optical scanning device can be provided, as compared with the case of providing a scanning lens for each light beam directed to a plurality of scanning surfaces (the photosensitive drums Y1, M1, C1, K1 in FIG. 21B, for example). When the first scanning lens L1 near the optical deflector 104 are shared by light beams directed to different scanning surfaces and when the inclined incidence angle is set as small as possible, the occurrence of wave aberration and the occurrence of scanning line curve can be suppressed. While the wave aberration can be corrected by the special surface, it is needless to mention that a smaller correction amount is preferable. To set a small inclined incidence angle, it is advantageous that the number of common light beams is decreased and the inclined incidence angle is set small, as the counter scanning system. However, when all light beams are shared, the number of scanning lenses can be minimized, and the cost can be decreased advantageously. Both systems can be selected depending on specifications required in the scanning optical system.

When the first scanning lens L1 is not shared, scanning lenses corresponding to the light beams from different light source devices, that is, scanning lenses corresponding to the light beams directed to different photosensitive drums Y1, M1, C1, K1, need to be arranged in the sub-scanning directions. In the counter scanning system, at least two-stage superimposition is necessary. In the one-side scanning system, four-stage superimposition is necessary. In this case, each scanning lens requires a rib at the outside of the valid range of the lens surface corresponding to each light flux, and the distance between the light beams adjacent in the sub-scanning direction becomes large. Accordingly, the inclined incidence angle increases, and the degradation of the optical performance increases. To increase the interval between the adjacent light beams without changing the inclined incidence angle, the first scanning lens L1 needs to be kept far from the optical deflector 104. Particularly, because the refractive power needs to be increased in the main scanning direction, the lens thickness increases, and the scanning lens becomes large, resulting in cost increase. Further, there are problems in assembling such as at the adhesion step for fixing the lenses to be superimposed, and the positioning with high precision.

The number of parts can be decreased and variations between parts can be minimized, by integrally forming a common lens. For example in the one-side scanning system shown in FIG. 21B, the number of scanning lenses can be decreased substantially by sharing all light beams directed to the photosensitive drums Y1, M1, C1, K1 as the scanning surface of yellow (Y), magenta (M), cyan (C), and black (K), by one lens. In the counter scanning system, the number of scanning lenses can be decreased by sharing the first scanning lens L1 by light beams of two colors, as shown in FIGS. 25A and 25B. That is, variations of part tolerance between the light beams corresponding to each color can be decreased, thereby obtaining stable optical performance between colors. By sharing the first scanning lens L1 and by passing a plurality of light beams off the reference axis in the sub-scanning direction of the common lens, the wave aberration can be corrected by the effect of the special surface explained later.

As described above, light beams need to be passed off the reference axis to the special surface. By using the special surface for the common lens, the wave aberration which becomes the problem in the inclined incidence optical system can be corrected. Further, a compact optical system and a low-cost optical system can be also achieved. By decreasing the number of lenses, the influence of variations of parts can be decreased, and stable optical performance can be achieved.

Example 3

Preferably, the light beams divided by the common light sources (200a, 200b) have angles of different signs in respective sub-scanning directions of the normal lines of the polygon mirrors 104a and 104b, and that the angles in the sub-scanning directions of the normal lines of the polygon mirrors 104a and 104b, of the light beams of which proceeding routes of the light beams deflected and divided by the light-dividing unit from the common light sources are smaller than the angles in the sub-scanning directions of the normal lines of the polygon mirrors 104a and 104b, of the light beams of which proceeding routes of the light beams are not deflected by the light-dividing unit.

Figure 22A:
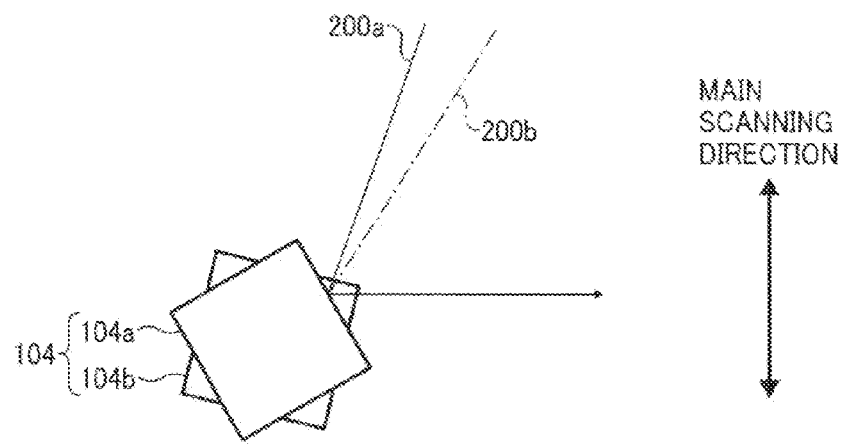
FIGS. 22A to 22C are schematic diagrams for explaining a case that a light-dividing unit is used in an optical scanning device of an oblique-incidence optical system.
Figure 22B:
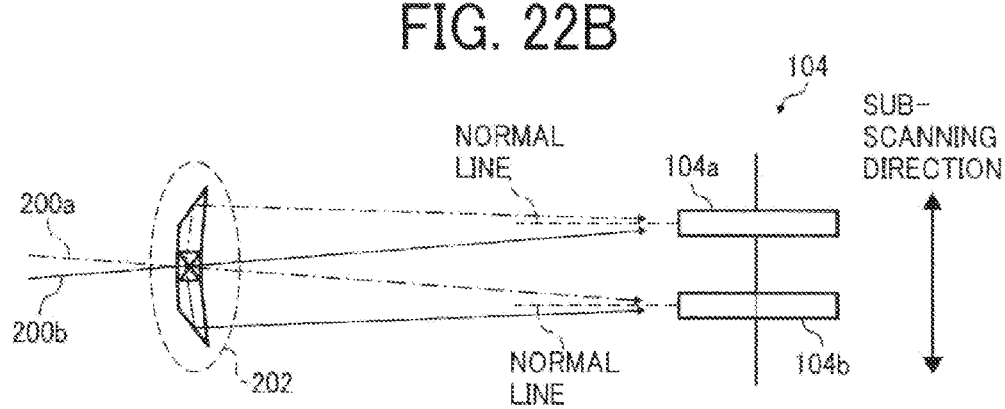
Figure 22C:
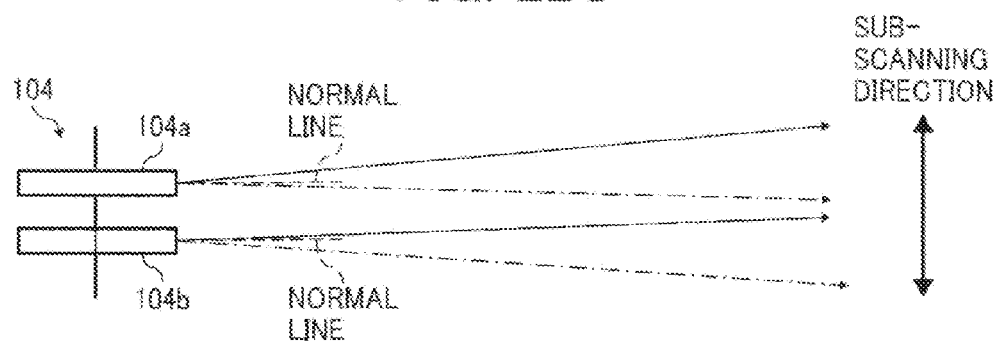

In Example 3, as shown in FIGS. 22A to 22C, the light-dividing unit uses the light-dividing prisms (202a, 202b). The light beams are incident at angles in the sub-scanning directions of the normal lines of the polygon mirrors 104a and 104b. This is explained using the one-side scanning system. When the light beams divided by the common light sources (200a, 200b) have angles of different signs (+ or −) in respective sub-scanning directions of the normal lines of the polygon mirrors 104a and 104b, the angles in the sub-scanning directions of the normal lines of the polygon mirrors 104a and 104b of the light beams that are deflected and reflected by the polygon mirrors 104a and 104b of the optical deflector 104 can be set to a minimum value. That is, as shown in FIG. 22B, the light beam from the light source 200a has a large angle in the counterclockwise direction of the sub-scanning direction, and a divided light beam has a small angle in the clockwise direction. Therefore, the interval between the light beams adjacent in the sub-scanning direction after the light beams are deflected and reflected by the polygon mirrors 104a and 104b of the optical deflector 104 becomes as shown in FIG. 22C. Accordingly, installation space of mirrors that divide and return the light beams to the corresponding scanning space becomes necessary. Consequently, the setting of the light beams to increase the interval in the sub-scanning direction of the adjacent light beams when reflected and emitted by the optical deflector 104 becomes necessary to secure the installation space of the mirrors that divide and return the adjacent light beams to corresponding scanning surfaces while setting the angles of the light beams in the sub-scanning directions small. Basically, setting horizontally the two center light beams can minimize the angles of the light beams in the sub-scanning directions. However, as described above, it is desirable that all light beams have angles in the sub-scanning directions, because light returning to the light source occurs, degrading image quality.

Further, preferably, the angles in the sub-scanning directions of the normal lines of the polygon mirrors 104a and 104b of the light beams of which proceeding routes are divided by the light-dividing prism (202a or 202b) from the common light sources (200a, 200b) are set smaller than the angles in the sub-scanning directions of the normal lines of the polygon mirrors 104a and 104b of the light beams of which proceeding routes are not divided by the light-dividing prism (202a or 202b) from the common light sources (200a, 200b). A change of angles in the sub-scanning directions gives a large influence to the optical performance, and degradation of the optical performance becomes larger when the angle becomes larger. Therefore, the angles in the sub-scanning directions of the light beams at the side where the light beams are returned by the light-dividing prisms (202a, 202b) are set small, and degradation of the optical performance can be minimized even when the variation items due to the tolerance increases.

Figure 23A:
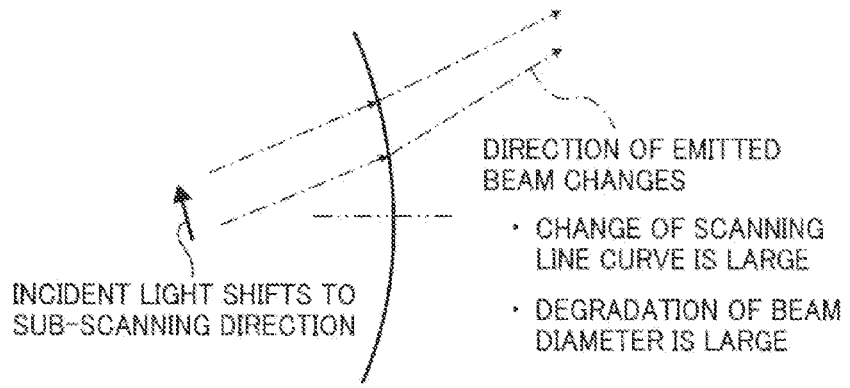
FIGS. 23A and 23B are schematic diagrams for explaining a scanning line curve and beam-diameter degradation depending on the refractive power of the surface of an optical element when a beam incident to the optical element is deviated to the sub-scanning direction.
Figure 23B:
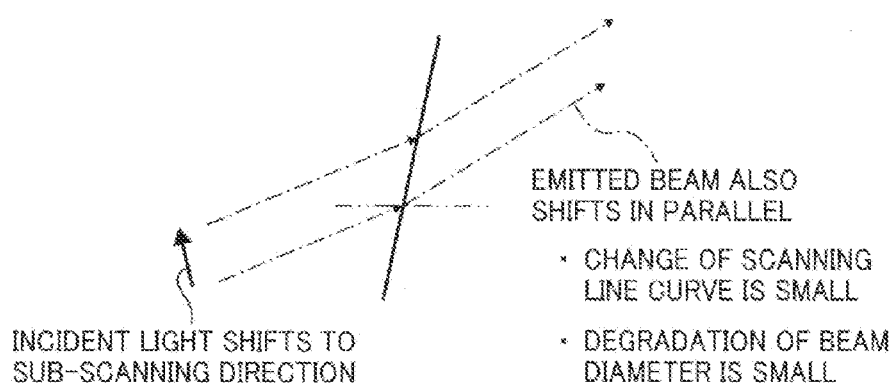
Figure 24A:
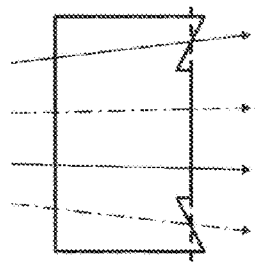
FIGS. 24A and 24B are schematic diagrams for explaining a surface of a scanning lens of an optical scanning device.
Figure 24B:
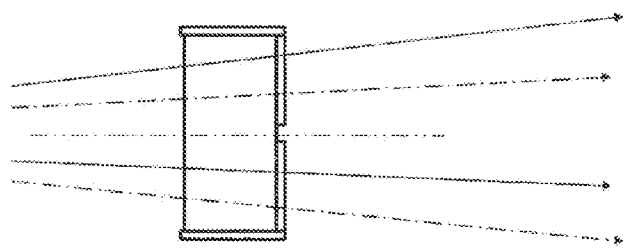

In the tandem optical scanning device, preferably, a plurality of light sources (two in this example) are available to correspond to usually the four photosensitive drums Y1, M1, C1, K1, and that the light beams from the respective light sources (200a, 200b) are incident to the polygon mirrors 104a and 104b of the common rotation axis corresponding to the angles symmetrical with the sub-scanning directions. Based on this configuration, as shown in FIGS. 23A and 23B, the incidence of the light beams to the scanning lens become symmetrical in the sub-scanning directions relative to the optical axis, and wave aberration can be corrected by the same special surface. The special surface can be also divided for each beam, or divided into an upper side (two beams) and a lower side (two beams) in the sub-scanning direction relative to the optical axis, or can be divided into an outside and an inside (two beams) at the upper stage, and an outside and an inside (two beams) at the lower stage, as shown in FIGS. 24A and 24B.

While a configuration of two scanning lenses (the first scanning lens L1, and the second scanning lens L2) is explained above, similar effects can be obtained by providing a special surface on the optical-deflector side instead of on the surface having largest refractive power in the sub-scanning direction, when one scanning lens is used.

When a special surface is formed on the scanning lens near the optical deflector 104, the special surface can be set to have a satisfactory shape, and wave aberration can be corrected satisfactorily, because of a large light flux width in the main scanning direction. To perform the wave aberration, the angles of beams in the light flux in the sub-scanning direction need to be deflected. As explained above, while the correction (deflection of the beams in the sub-scanning direction) is performed by the special surface, when the width of the light flux is small, the correction becomes difficult. That is, while the direction of the light flux can be changed by introducing the special surface to a position where the light flux width in the sub-scanning direction is narrowed, that is, a position near the scanning surface (photosensitive drum), the beams in the light flux cannot be easily deflected in the sub-scanning direction.

Accordingly, it is most desirable to share the scanning lens nearest to the optical deflector with a plurality of light beams and use the special surface on this incidence surface, to realize the optical scanning device suitable for satisfactory correction of wave aberration, obtaining stable optical performance, and achieving low cost. However, the present invention is not limited to this example, and includes any device that can obtain similar effects.

Example 4

Other example of the special surface of the first scanning lens L1 is explained next. Effect similar to that obtained from the special surface explained in the Example 2 can be obtained, by using a surface having a different tilt-eccentricity amount (hereinafter, "special tilt surface") of the sub-scanning direction in the main scanning direction, without having power in the sub-scanning direction.

The surface shape of the special surface of the first scanning lens L1 is based on the following shape expression, but not limited to the shape expression. The same surface shape can also be specified using other shape expression.

The surface shape of the special surface of the first scanning lens L1 can be expressed by the following shape expression, when a paraxial curvature radius within the "main-scanning cross section" as a flat cross section parallel with the main scanning direction including an optical axis is RY, a distance in the main scanning direction from the optical axis is Y, high coefficients are A, B, C, D, . . . , and a paraxial curvature radius within the "sub-scanning cross section" orthogonal with the main scanning cross section is RZ.

$$X(Y,Z)=Y^2 \cdot Cm/\{1+\sqrt{[1-(1+K)\cdot(Y\cdot Cm)^2]}\}+A\cdot Y^4+B\cdot Y^6+C\cdot Y^8+D\cdot Y^{10}+E\cdot Y^{12}+\ldots+(Cs(Y)\cdot Z^2)/\{1+\sqrt{[1-Cs(Y)\cdot Z)^2]}\}+(F0+F1\cdot Y+F2\cdot Y^2+F3\cdot Y^3+F4\cdot Y^4+\ldots)Z$$

where $Cm=1/RY$ $Cs(Y)=1/RZ$

In the above expression, $(F0+F1\cdot Y+F2\cdot Y^2+F3\cdot Y^3+F4\cdot Y^4+\ldots)Z$ expresses a part of the tilt amount. When there is no tilt amount, F0, F1, F2, . . . are all 0. When F1, F2, . . . are not 0, the tilt amount changes in the main scanning direction.

A reason why the shape in the sub-scanning direction of the special tilt surface of the first scanning lens L1 is a flat shape is explained below.

When the sub-scanning direction has a curvature, a shape in the main scanning direction changes greatly at each height in the sub-scanning direction. When the incidence position of the light beam is deviated in the sub-scanning direction due to a temperature variation and an assembly error of the optical elements, a large variation occurs in the magnification error. In the color device, beam spot positions are deviated among colors, and a color shift occurs. When the special surface in the sub-scanning direction is a flat shape having no curvature, a shape error in the main scanning direction can be made small at each height in the sub-scanning direction, and a magnification error variation can be made small when the incidence position of the light beam is deviated in the sub-scanning direction. Accordingly, occurrence of color shift can be suppressed.

When the special surface is used, the main scanning shape actually changes depending on the height in the sub-scanning direction. However, this amount is small, and the change of the main scanning shape can be made smaller than that when a curvature is provided in the sub-scanning direction. As a result, a difference of magnification variation between the light beams due to the occurrence of a temperature distribution can be made small. By taking synchronization, color shift at the intermediate image height when a write starting position and a write ending position are matched for each light beam can be decreased.

As shown in FIG. 23B, when the incident light shifts to the sub-scanning direction, the beam proceeding direction is also shifted, and the change in this direction is small, because the special surface does not have refractive power. On the surface having a curvature in the sub-scanning direction, that is, on the surface having refractive power, when the incident light shifts to the sub-scanning direction, the proceeding direction of the beam also changes due to a change in the refractive power, as shown in FIG. 23A. When the change amount in this proceeding direction is different at each image height, the scanning line is curved greatly. Further, the light flux is skewed, the wave aberration is degraded, and the beam spot diameter is degraded. For the reasons mentioned above, the special surface in the sub-scanning direction needs to have a flat shape having no curvature.

When the special surface is employed in the common lens, it is desirable to set the special surface for each light beam. The special surface in the Example 2 has a curvature. Therefore, even when the angle of the sub-scanning direction incident to the scanning lens is different, the incidence height is different, and the wave aberration on the same surface can be corrected. When the sub-scanning cross section has a non-arc shape, more satisfactory correction is possible. However, in this example, the common special surface makes it difficult to set a tilt amount in the sub-scanning direction optimum for each angle in the sub-scanning direction.

Therefore, when the special surface is employed in the scanning lens L1 of the optical scanning device of the counter scanning system as shown in FIGS. 25A and 25B, a two-stage special surface can be used, and a low-cost scanning lens can be used. In this case, each light beam divided by the light-dividing element (202a or 202b) from the same light source (200a or 200b) can have the same angle. The scanning lens L1 does not need to be one, and the scanning lenses can be superimposed at two stages.

A special surface for each light beam can be also set to the first scanning lens L1 in the optical scanning device of a one-side scanning system as shown in FIG. 21B.

Example 5

The other problem of a scanning line curve in the inclined incidence optical system can be corrected by the second scanning lens L2 arranged for each light beam directed to different scanning surfaces (the photosensitive drums 1Y, 1M, 1C, 1K) after passing through the first scanning lens (common lens) L1.

The second scanning lens L2 arranged for each light beam directed to different scanning surfaces (the photosensitive drums 1Y, 1M, 1C, 1K) as shown in FIG. 21B can be shifted and decentered to the sub-scanning directions, or tilt decentered. Improvement of the scanning line curve by this eccentricity is known. The occurrence of the scanning curve is as described above, and therefore, the same explanation is not repeated.

At least one surface of the lens arranged for each light beam from a plurality of light sources has a different shift-eccentricity amount of the sub-scanning direction in the main scanning direction. With this arrangement, the image point position in the main scanning direction, that is, at each image height, is corrected to the sub-scanning direction, thereby correcting the scanning line curve.

The proceeding route of the light beam can be changed to the sub-scanning direction by using the above surface. That is, by optimizing the sub-scanning direction eccentricity in the main scanning direction, the light beam scanned in the main scanning direction can be deflected to a desired direction (sub-scanning), thereby correcting the scanning line curve.

Preferably, the surface for correcting the scanning line curve is used in the scanning lens (the second scanning lens L2 in FIGS. 21A and 21B) at the most scanning-surface side. The diameter of the light flux becomes smaller toward the scanning surfaces (the photosensitive drums 1Y, 1M, 1C, 1K). Therefore, even when the proceeding direction of the light flux is changed to correct the scanning line curve, influence to the inside of the light flux is small, and degradation of a state that the wave aberration is corrected by the special surface of the scanning lens (the first scanning lens L1 in FIGS. 21A and 21B) near the optical deflector 7 can be prevented (the light flux after the correction is not skewed substantially, and the wave surface is not disturbed).

That is, to correct the wave aberration, the scanning lens (the first scanning lens L1 in FIGS. 21A and 21B) near the optical deflector 7 that can easily correct the proceeding direction of the light beam within the light flux having a large light flux diameter is effective.

In the scanning lens (the second scanning lens L2 in FIGS. 21A and 21B) near the scanning surface, light beams directed to respective image heights are more divided, and superimposition of adjacent light beams is small. Therefore, the shift-eccentricity amount in the sub-scanning direction can be set minutely, and the scanning line curve can be corrected satisfactorily.

A surface shape of the scanning lens (the second scanning lens L2 in FIGS. 21A and 21B) near the scanning surface is explained. The surface shape of this scanning lens is based on the following shape expression, but not limited to the shape expression. The same surface shape can be also specified using other shape expression.

The surface shape of the scanning lens can be expressed by the following shape expression, when a paraxial curvature radius within the "main-scanning cross section" as a flat cross section parallel with the main scanning direction including an optical axis is RY, a distance in the main scanning direction from the optical axis is Y, high coefficients are A, B, C, D, ..., and a paraxial curvature radius within the "sub-scanning cross section" orthogonal with the main scanning cross section is RZ.

$$X(Y,Z)=Y^2 \cdot Cm/\{1+\sqrt{[1-(1+K)\cdot(Y\cdot Cm)^2]}\}+A\cdot Y^4+B\cdot Y^6+C\cdot Y^8+D\cdot Y^{10}+E\cdot Y^{12}+\ldots+(Cs(Y)\cdot[Z-Z0(Y)]^2)/\{1+\sqrt{[1-Cs(Y)^2\cdot(Z-Z0)(Y))^2]}\}+(F0+F1\cdot Y+F2\cdot Y^2+F3\cdot Y^3+F4\cdot Y^4+\ldots)Z$$

where $$Cm=1/RY$$

$$Cs(Y)=1/RZ$$

$$Cs(Y)=1/RZ+a\cdot Y+b\cdot Y^2+c\cdot Y^3+d\cdot Y^4+e\cdot Y^5+f\cdot Y^6+g\cdot Y^7+h\cdot Y^8+i\cdot Y^9+j\cdot Y^{10}+\ldots$$

$$Z0(Y)=D0+D1\cdot Y+D2\cdot Y^2+D3\cdot Y^3+D4\cdot Y^4+\ldots$$

In the above expression, $(F0+F1\cdot Y+F2\cdot Y^2+F3\cdot Y^3+F4\cdot Y^4+\ldots)Z$ expresses a part of the tilt amount. When there is no tilt amount, F0, F1, F2, ... are all 0. When F1, F2, ... are not 0, the tilt amount changes in the main scanning direction.

In the above expression, $Z0(Y)=D0+D1\cdot Y+D2\cdot Y^2+D3\cdot Y^3+D4\cdot Y^4+\ldots$ expresses a part of the shift amount in the sub-scanning direction. When the expression has a coefficient of D, the shift amount changes in the main scanning direction. $Cs(Y)=1/RZ+a\cdot Y+b\cdot Y^2+C\cdot Y^3+d\cdot Y^4+e\sim Y^5+f\cdot Y^6+g\cdot Y^7+h\cdot Y^8+i\cdot Y^9+j\cdot Y^{10}+\ldots$ means that the curvature of the sub-scanning direction changes to the main scanning direction.

However, when the sub-scanning direction has a flat-surface shape, the surface shape does not change even when a shift-eccentricity occurs (even when the coefficient of D is set). This is not within the range of the present invention.

That is, when at least one surface of the scanning lens (the second scanning lens L2 in FIGS. 21A and 21B) arranged for each light beam from a plurality of light sources has a different shift-eccentricity amount of the sub-scanning direction in the main scanning direction, the scanning line curve can be corrected satisfactorily.

Example 6

Other example of the correction of a scanning line curve is explained. When a surface having a different tilt-eccentricity amount of the sub-scanning direction in the main scanning direction (hereinafter, "special tilt surface") is used without having power in the sub-scanning direction, instead of the bus-line curved surface, the scanning line curve can be corrected more satisfactorily.

That is, by changing the tilt-eccentricity amount of the sub-scanning direction in the main scanning direction, the proceeding route of the light beam can be changed to the sub-scanning direction. When this tilt amount is given at an optimum level by differentiating the tilt amount in the main scanning direction, the light beam scanned in the main scanning direction can be deflected in a desired direction (sub-scanning), thereby correcting the scanning line curve. Like the bus-line curved surface explained in the Example 3, preferably, the special tilt surface is also used in the scanning lens at the most scanning-surface side. This reason is as described in the Example 5, and is not explained here.

The surface shape of the special tilt surface can be expressed by the following shape expression. However, the content of this invention is not limited to the following shape expression, and the same surface shape can be also specified using a separate shape expression.

The surface shape of the special tilt surface can be expressed by the following shape expression, when a paraxial curvature radius within the "main-scanning cross section" as a flat cross section parallel with the main scanning direction including an optical axis is RY, a distance in the main scanning direction from the optical axis is Y, high coefficients are A, B, C, D, . . . , and a paraxial curvature radius within the "sub-scanning cross section" orthogonal with the main scanning cross section is RZ.

$$X(Y,Z)=Y^2 \cdot Cm/\{1+\sqrt{[1-(1+K) \cdot (Y \cdot Cm)^2]}\}+A \cdot Y^4+B \cdot Y^6+ C \cdot Y^8+D \cdot Y^{10}+E \cdot Y^{12}+ \ldots +(Cs(Y) \cdot Z^2)/\{1+\sqrt{[1-Cs(Y) \cdot Z)^2]}\}+(F0+F1 \cdot Y+F2 \cdot Y^2+F3 \cdot Y^3+F4 \cdot Y^4+ \ldots )Z$$

where, Cm=1/RY, and Cs(Y)=1/RZ.

In the above expression, $(F0+F1 \cdot Y+F2 \cdot Y^2+F3 \cdot Y^3+F4 \cdot Y^4+ \ldots )Z$ expresses a part of the tilt amount. When there is no tilt amount, F0, F1, F2, . . . are all 0. When F1, F2, . . . are not 0, the tilt amount changes in the main scanning direction.

The reason why the special tilt surface in the sub-scanning direction has a flat shape having no curvature is as described above, and therefore, the same explanation is not repeated.

Example 7

High speed and high density of the optical scanning device and the image forming apparatus have been progressed in recent years. When a polygon scanner is used for the optical deflector 7, high speed and high density can be achieved, by rotating the polygon mirrors 104a and 104b at a high speed. However, there is a limit to the rotation number. To achieve high-speed and high-density recording without increasing the rotation number of the polygon scanner, the same scanning surface is scanned by a plurality of light beams.

The optical scanning device can be a multi-beam light-source device using a semiconductor laser array having a plurality of light emitting points as a light source, or using a plurality of light source having a single light emitting point or a plurality of light emitting points as a light source. A plurality of light beams can be simultaneously scanned on the photosensitive surface. With this arrangement, the optical scanning device and the image forming apparatus achieving high speed and high density can be configured. With such optical scanning device and the image forming apparatus, effects similar to those explained above can be also obtained.

Figure 26:
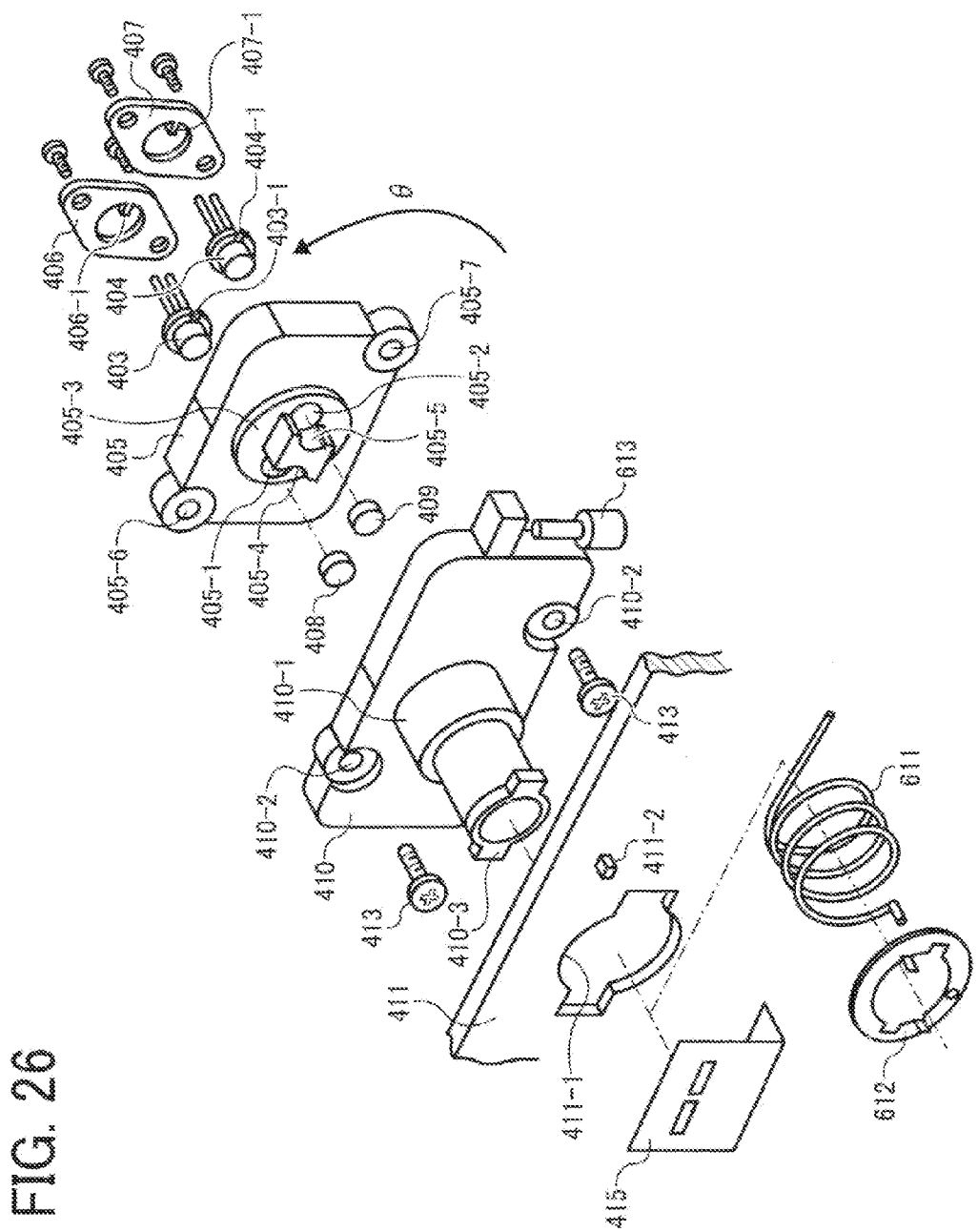
FIG. 26 is an exploded perspective view of a light source constituting a multi-beam light-source device.

A beam-crossing multi-beam light-source device is explained as an example. FIG. 26 is an exploded perspective view of a light source constituting a multi-beam light-source device.

In FIG. 26, two semiconductor lasers (LD) 403 and 404 as light sources are separately engaged with engagement holes 405-1 and 405-2 formed on a base member 405 respectively, from the backside of the base member 405. The engagement holes 405-1 and 405-2 are slightly inclined by a predetermined angle, by about 1.5° in this example, to the main scanning direction. The semiconductor lasers 403 and 404 engaged with the engagement holes are also inclined by about 1.5° to the main scanning direction. The semiconductor lasers 403 and 404 are formed with notches in their cylindrical heat sinks 403-1 and 404-1. By matching projections 406-1 and 407-1 formed in the center round circles of pressing members 406 and 407 with the notches of the cylindrical heat sinks 403-1 and 404-1, layout directions of the light sources can be matched. The pressing members 406 and 407 are fixed to the base member 405 with a screw from the back surface of the base member 405, so that the semiconductor lasers 403 and 404 are fixed to the base member 405. Collimator lenses 408 and 409 adjust optical axis directions by making external peripheries of the collimator lenses lie along semi-circular fitting guide surfaces 405-4 and 405-5 of the base member 405, and are positioned and adhered so that scattered beams emitted from the light-emitting points become a parallel light flux.

In the example of FIG. 26, light beams from the respective semiconductor lasers cross within the main scanning surface. Therefore, the engagement holes 405-1 and 405-2 and the semi-circular fitting guide surfaces 405-4 and 405-5 are formed with inclination along the light beam direction.

A cylindrical engaging unit 405-3 of the base member 405 is engaged with a holder member 410, and a screw 413 is passed through a though-hole 410-2 and is spirally engaged with screw holes 405-6 and 405-7 of the base member 405, thereby fixing the base member 405 to the holder member 410, and constituting the light source.

The holder member 410 of the light source has its cylindrical unit 410-1 engaged with a reference hole 411-1 provided on a fitting wall 411 of the optical housing. A stopper member 612 is engaged with a cylindrical unit 410-3, by inserting a spring 611 from the front side of the fitting wall 411. With this arrangement, the holder member 410 is held in close adhesion to the back side of the fitting wall 411, thereby holding the light source in the optical housing. One end of the spring 611 is hooked on a projection 411-2 of the fitting wall 411, and the other end of the spring 611 is hooked on the light source, thereby generating rotation force in the light source using the center of the cylindrical unit as a rotation axis. The holder member 410 has an adjustment screw 613 to stop the rotation force of the light source. The adjustment screw 613 can adjust the beam pitch by rotating the whole unit in a θ-direction around the optical axis. An aperture 415 is arranged in front of the light source. The aperture 415 is provided with a slit corresponding to each semiconductor laser, and is fitted to the optical housing to define the emission diameter of the light beam.

While an example of the multi-beam light-source device is explained above, a semiconductor laser array (LD array) having a plurality of light emitting points can be also used for the semiconductor laser. In this case, more multi-beams can be used.

Example 8

The optical scanning device according to the second embodiment is mounted on the image forming apparatus shown in FIG. 14.

In this example, an optical scanning device 19 has a configuration of the optical scanning device described in the Examples 1 to 7. With this arrangement, there can be realized the image forming apparatus that can effectively correct a scanning line curve, degradation of wave aberration, and can secure high-definition image reproducibility without color shift.

While the optical scanning device 19 of the one-side scanning system is explained as an example, the optical scanning device of the counter scanning system having the configuration as shown in FIG. 9 can be also used. In this case, the optical deflector 7 is arranged at the center. By sandwiching the optical deflector 7, a scan-imaging optical system (scanning lens, mirror, etc.) for Y and M is arranged at one side, and a scan-imaging optical system (scanning lens, mirror, etc.) for C and K is arranged at the other side. With this arrangement, one optical deflector 7 can simultaneously deflect and scan four light beams by allocating the light beams to the two directions. In this case, when the scan-imaging optical system for each color has a configuration of the optical scanning device described in the Examples 1 to 7, there can be achieved the image forming apparatus that can effectively correct a scanning line curve, degradation of wave aberration, and can secure high-definition image reproducibility without color shift.

As explained above based on the examples, according to the second embodiment, the light-dividing unit 4 divides the light beam from the common light source 200a or 200b into two. A deflector having multi-stage polygon mirrors 104a and 104b deflects the light beams and simultaneously scans different scanning surfaces. Therefore, there can realized the optical scanning device that can simultaneously scan the four scanning surfaces (the photosensitive drums 1Y, 1C, 1M, 1K), using the two light sources 200a and 200b, and that can output a satisfactory image at a high speed, while decreasing the number of light sources. Consequently, the number of parts of the optical scanning device can be decreased, low cost can be achieved, a trouble rate of the whole units can be decreased, and recyclability can be improved. The surface shape of the scanning lens constituting the scanning optical system is designed as described above, the scanning line curve and degradation of the wave aberration in the optical scanning device of the inclined incidence system can be effectively corrected. The difference of quality between beams scanning different scanning surfaces (photosensitive surfaces) can be decreased.

Further, according to the second embodiment, by using the multi-beam light source for the light source, a plurality of scanning lines can be formed at one-time scanning on the same scanning surface, thereby achieving high speed and high density of the image forming apparatus. The image forming apparatus capable of outputting an image in proper concentration with little variation of concentration can be realized. Further, the image forming apparatus capable of outputting an image of excellent color reproduction can be realized.

Described below is a third embodiment of the present invention. An image forming apparatus and an optical scanning device of the third embodiment are of basically the same configuration as the tandem color image forming apparatus shown in FIG. 14 and the optical scanning device of the counter scanning system shown in FIG. 15, respectively. A secondary array and the VCSEL are similar to those explained above with reference to FIGS. 3 to 5, and therefore, the same explanation is not repeated.

Figure 27A:
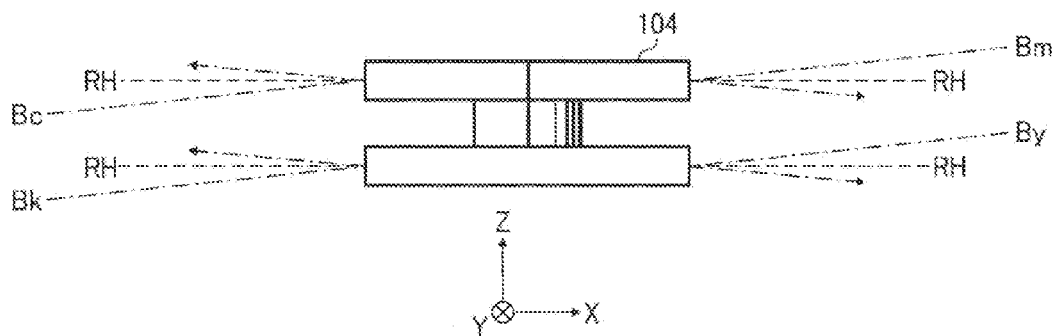
FIGS. 27A to 27C are schematic diagrams for explaining a beam directed from the polygon mirror to each fθ lens.

In the optical scanning device 1010, as shown in FIG. 27A as an example, a beam Bk from a cylinder lens 204a and a beam Bc from a cylinder lens 204b are set to be incident to the polygon mirror 104 with inclination to the −Z side relative to a normal line direction RH of the deflection-reflection surface of the polygon mirror 104. A beam Bm from a cylinder lens 204c and a beam By from a cylinder lens 204d are set to be incident to the polygon mirror 104 with inclination to the +Z side relative to the normal line direction RH of the deflection-reflection surface of the polygon mirror 104. That is, the beam incident to the −X side of the polygon mirror 104 and the beam incident to the +X side of the polygon mirror 104 are inclined to mutually opposite sides relative to the normal line direction of the polygon mirror 104, relative to at least the sub-scanning direction.

The inclination angle of the beam Bk from a cylinder lens 204a and the inclination angle of the beam Bc from a cylinder lens 204b are equal to each other, and the inclination angle of the beam Bm from a cylinder lens 204c and the inclination angle of the beam By from a cylinder lens 204d are equal to each other.

The sizes of the inclination angles of the beam Bk from a cylinder lens 204a and the beam Bc from a cylinder lens 204b are equal to the sizes of the inclination angles of the beam Bm from a cylinder lens 204c and the beam By from a cylinder lens 204d. As an example, the size of the inclination angle is set to 0.7 degree.

Figure 27B:
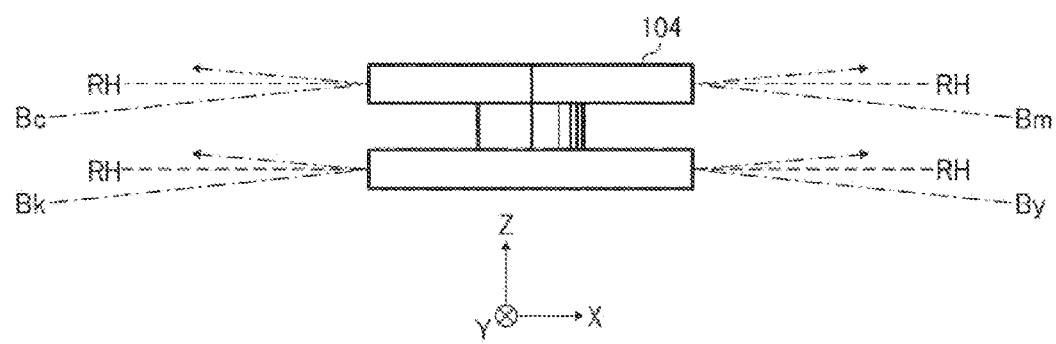
Figure 27C:
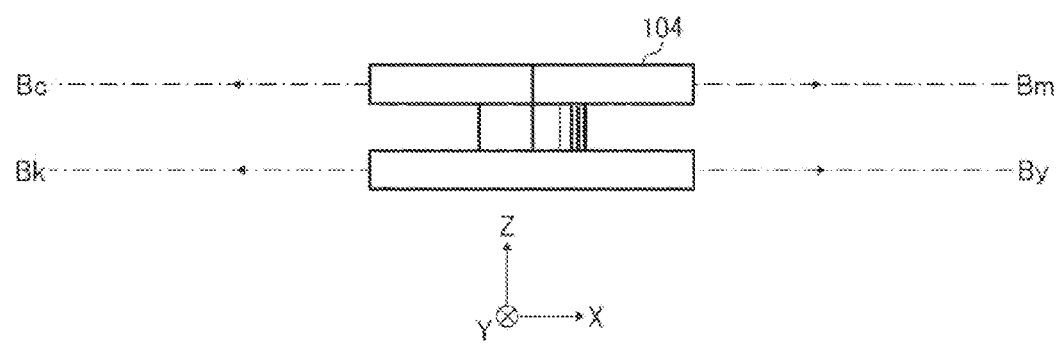

When the beam Bm from a cylinder lens 204c and the beam By from a cylinder lens 204d are incident to the polygon mirror 104 with inclination to the −Z side relative to the normal line direction RH of the deflection-reflection surface of the polygon mirror 104, as shown in FIG. 27B, and when all beams incident to the polygon mirror 104 coincide with the normal line direction of the deflection-reflection surface of the polygon mirror 104 relative to the sub-scanning direction, as shown in FIG. 27C, for example, a reflection beam from one of the fθ lenses arranged by sandwiching the polygon mirror 104 is incident to the other fθ lenses as a flare light.

Figure 28:
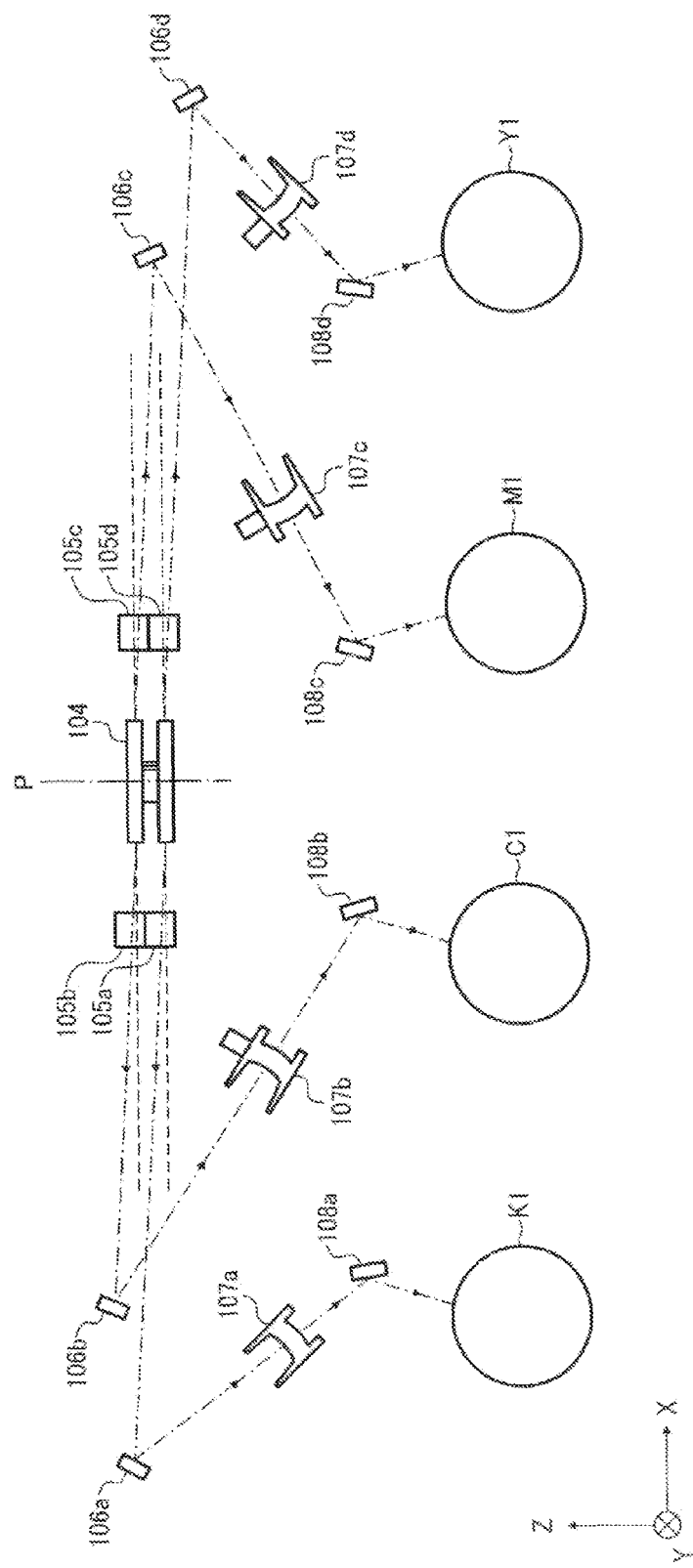
FIG. 28 is a side view of the optical scanning device.

The black beam passing through the fθ lenses 105a forms an image in a spot shape on the photosensitive drum K1 via the reflection mirror 106a, the toroidal lens 107a, and the reflection mirror 108a (see FIG. 28).

The cyan beam passing through the fθ lenses 105b forms an image in a spot shape on the photosensitive drum C1 via the reflection mirror 106b, the toroidal lens 107b, and the reflection mirror 108b (see FIG. 28).

The magenta beam passing through the fθ lenses 105c forms an image in a spot shape on the photosensitive drum 30c via the reflection mirror 106c, the toroidal lens 107c, and the reflection mirror 108c (see FIG. 28).

The yellow beam passing through the fθ lenses 105d forms an image in a spot shape on the photosensitive drum 30d via the reflection mirror 106d, the toroidal lens 107d, and the reflection mirror 108d (see FIG. 28).

That is, the optical scanning device 1010 corresponds to four photosensitive drums, and has four scanning optical systems that focus a plurality of beams deflected by the polygon mirror 104 in the corresponding photosensitive drums.

In the optical scanning device 1010, the number of reflection mirrors that bend the optical path of the light flux directed toward the photosensitive drum K1 is two, the number of reflection mirrors that bend the optical path of the light flux directed toward the photosensitive drum C1 is two, the number of reflection mirrors that bend the optical path of the light flux directed toward the photosensitive drum M1 is two, and the number of reflection mirrors that bend the optical path of the light flux directed toward the photosensitive drum Y1 is two, respectively. That is, a difference between the numbers of the reflection mirrors provided corresponding to each photosensitive drum is an even number. Accordingly, as shown in FIG. 17A, for example, the bending direction of the scanning line each photosensitive drum becomes the same direction, thereby easily decreasing a color shift. When a difference between the number of the reflection mirrors provided corresponding to the photosensitive drum Y1 and the number of the reflection mirrors provided corresponding to other three photosensitive drums is one, for example, the bending directions of the scanning lines in the photosensitive drum Y1 becomes opposite, as shown in FIG. 17B, and this has large shifting of colors.

In FIG. 15, the converging lens 156a is arranged on the optical path of the light reflected by the apertured plate 201a, and converges the light reflected by the apertured plate 201a. The converging lens 156b is arranged on the optical path of the light reflected by the apertured plate 201b, and converges the light reflected by the apertured plate 201b.

In FIG. 15, the light receiving element 157a is arranged at a focusing position of the light via the converging lens 156a, and receives the light via the converging lens 156a. The light receiving element 157b is arranged at a focusing position of the light via the converging lens 156b, and receives the light via the converging lens 156b.

Each light receiving element outputs a signal (photoelectric conversion signal) corresponding to the received light intensity.

As is clear from the above explanations, in the optical scanning device 1010, the monitoring optical system includes the apertured plates and the convergence lenses.

As explained above, according to the third embodiment, the optical scanning device 1010 includes the two light sources (200a, 200b) having 40 light emitting units, the polygon mirror 104 having deflection-reflection surfaces that deflect beams from the two light sources, four scanning optical systems that individually correspond to the four photosensitive drums (K1, C1, M1, Y1) and focus beams deflected by the polygon mirror 104 onto the corresponding photosensitive drums, and two monitoring optical systems that monitor light amounts of beams emitted from each light source. The beam incident to the −X side of the polygon mirror 104 and the beam incident to the +X side of the polygon mirror 104 are inclined to mutually opposite sides relative to the normal line direction of the polygon mirror 104, relative to at least the sub-scanning direction. Accordingly, it is possible to suppress the beams emitted from the light sources and reflected from the deflection-reflection surfaces to return to the light source side. Therefore, the amount (intensity) of the beam emitted from each light source can be monitored with high precision. As a result, the photosensitive drum surface can be stably scanned by the beam.

Each of the four scanning optical system includes two mirrors that bend the optical route of the beam, and a difference between the numbers of the mirrors of each scanning optical system is zero. Accordingly, generation of color shift can be suppressed.

The beam incident to the −X side of the polygon mirror 104 and the beam incident to the +X side of the polygon mirror 104 are inclined to mutually opposite sides relative to the normal line direction of the polygon mirror 104, relative to at least the sub-scanning direction. Accordingly, a reflection beam from one of the fθ lenses arranged by sandwiching the polygon mirror 104 can be prevented from being incident to the other fθ lenses as a flare light.

The method of increasing the writing density in the sub-scanning direction using a multibeam light source includes (1) the method of decreasing a lateral magnification in the sub-scanning direction of the optical system provided on the optical route through which a beam emitted from the light source reaches the scanning surface, and (2) the method of decreasing the interval of the light emitting units in the sub-scanning direction (indicated by c in FIG. 3). However, according to the method of (1), in the apertured plate that defines the beam diameter on the scanning surface, a width of the aperture in the sub-scanning direction needs to be set small, and this results in shortage of light amount (intensity). On the other hand, according to the method of (2), there is an influence of heat interference between the light emitting units, and it becomes difficult to secure space necessary to pass wirings from the light emitting units.

A plurality of light emitting units are arranged two dimensionally, and the interval between two light emitting units located at both ends in the direction corresponding to the main scanning direction is larger than the interval between two light emitting units located at both ends in the direction corresponding to the sub-scanning direction. Therefore, the interval between the light emitting units in the sub-scanning direction can be made smaller, while decreasing the influence of heat interference between the light emitting units and securing space necessary to pass the wirings of the light emitting units.

The printer of the third embodiment includes the optical scanning device 1010 capable of stably scanning the scanning surface by light. As a result, a high-quality image can be formed at a high speed.

While each mesa of the two-dimensional array 100 has a circular shape in the above embodiments, each mesa can be of an arbitrary shape such as an elliptical shape, a square shape, and a rectangular shape.

While the number of light emitting units constituting one row of light emitting units is ten and the number of rows of light emitting units is four in the above embodiments, the numbers are not so limited. Preferably, a plurality of light emitting units are arranged two dimensionally, and the interval between two light emitting units located at both ends in the direction corresponding to the main scanning direction is larger than the interval between two light emitting units located at both ends in the direction corresponding to the sub-scanning direction.

While, in the above embodiments, the interval between the two light emitting units located at both ends in the M direction is explained as 270 micrometers and the interval between the two light emitting units located at both ends in the S direction is explained as 135 micrometers, the values of these intervals are cited by way of example and without limitation. Preferably, the interval between the two light emitting units located at both ends in the M direction is larger than the interval between the two light emitting units located at both ends in the S direction.

While, in the above embodiments, the inclined angle of light incident to the polygon mirror 104 is explained as 0.7 degree relative to the normal direction of the polygon mirror 104 relative to at least the sub-scanning direction, the value of the inclined angle is cited by way of example and without limitation. However, when the inclined angle increases, the wave aberration increases. Therefore, preferably, the size of the inclined angle is within a range of 0.5 degree to 1.0 degree.

Figure 29:
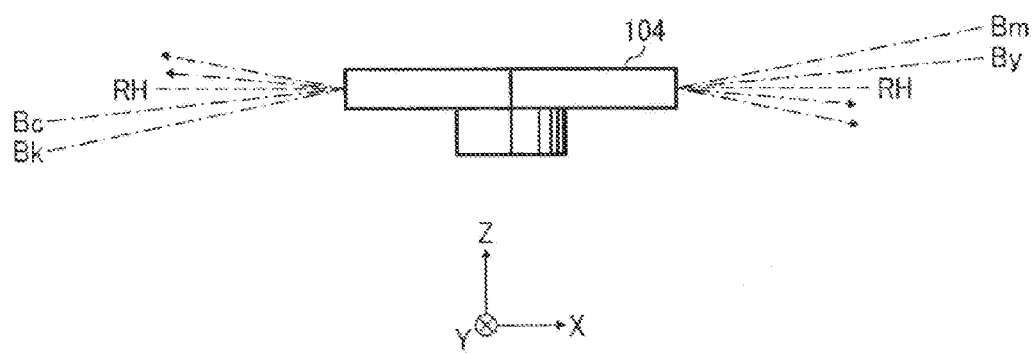
FIG. 29 is a schematic diagram for explaining a modification of the polygon mirror.

While, in the above embodiments, the polygon mirror 104 includes a two-stage four-surface mirror, the polygon mirror 104 can also includes a one-stage four-surface mirror. In this case, as shown in FIG. 29, for example, when the beam Bk from the cylinder lens 204a and the beam Bc from the cylinder lens 204b are incident to the same position of the deflection-reflection surface relative to the sub-scanning direction, preferably, the inclined angle of the beam Bk from the cylinder lens 204a and the inclined angle of the beam Bc from the cylinder lens 204b are different from each other. Similarly, when the beam Bm from the cylinder lens 204c and the beam By from the cylinder lens 204d are incident to the same position of the deflection-reflection surface relative to the sub-scanning direction, preferably, the inclined angle of the beam Bm from the cylinder lens 204c and the inclined angle of the beam By from the cylinder lens 204d are different from each other. For example, the size of the inclined angle of the beam Bc and beam By can be set to 0.7 degree, and the size of the inclined angle of the beam Bk and beam Bm can be set to 1.46 degree.

Figure 30:
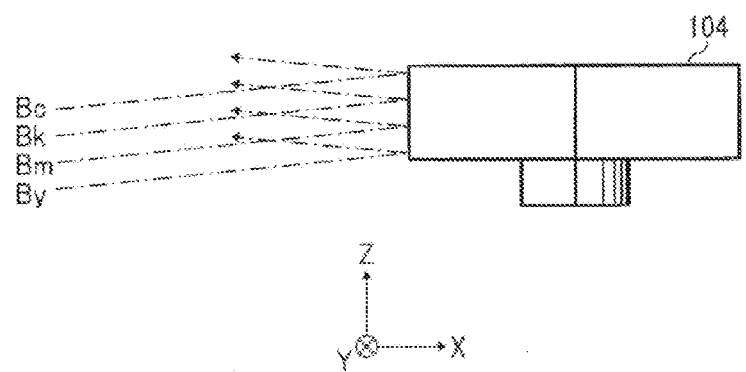
FIG. 30 is a schematic diagram for explaining an optical scanning device of a one-side scanning system.

While, in the above embodiments, the optical scanning device 1010 is explained as the counter-scanning system optical scanning device, the optical scanning device 1010 can be also the one-side-scanning system optical scanning device. In this case, as shown in FIG. 30, for example, the beam Bk from the cylinder lens 204a, the beam Bc from the cylinder lens 204b, the beam Bm from the cylinder lens 204c, and the beam By from the cylinder lens 204d are all incident to one side of the polygon mirror side (the −X side in FIG. 30). When the beams are incident to different positions on the deflection-reflection surface relative to the sub-scanning direction, the inclined angles of the beams can be set the same.

In the above embodiments, as shown in FIGS. 11 to 13, for example, a two-dimensional array (the two-dimensional array 200) having the material of part of the plurality of semiconductor layers of the two-dimensional array 100 can be used in place of the two-dimensional array 100. Because the configurations shown in FIGS. 11 to 13 are explained above, the same explanation is not repeated.

In the above embodiments, a light source can be provided for each color. That is, four light sources can be provided.

While, in the above embodiments, the tandem color printer is explained as the image forming apparatus, the image forming apparatus can be, for example, a copier, a facsimile machine, and an MFP. Any of them including the optical scanning device 1010 can form a high-quality image at a high speed.

The image forming apparatus can employ, as an image carrier, a light-emitting medium (positive printing plate) that emits light using heat energy of a beam spot. In this case, a visible image can be directly formed on the carrier by optical scanning.

While, in the above embodiments, a multi-color printer is explained as the image forming apparatus, a single-color image forming apparatus can also form a high-quality image at a high speed.

As explained above, according to an embodiment of the present invention, a scanning surface can be stably scanned with light. Moreover, a high-quality image can be formed at a high speed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface with light beams, the optical scanning device comprising:
   a light source that includes a plurality of vertical-cavity surface light-emitting lasers (VCSEL) that emits light beams in only one direction;
   a deflector that includes a deflection-reflection surface for deflecting the light beams from the light source;
   a first optical system that is arranged on an optical path of the light beams between the light source and the deflector, and guides the light beams from the light source to the deflector, the first optical system including a plate having an opening that defines a diameter of the light beams in at least a sub-scanning direction;
   a second optical system that guides the light beams deflected by the deflector to the scanning surface; and
   a monitoring optical system that monitors an amount of light flux emitted from the plurality of surface light-emitting lasers, the amount of light flux monitored being used to correct a driving current of the plurality of vertical-cavity surface light-emitting lasers,
   wherein light beams directed from the deflector to the second optical system are inclined from a normal line of the deflection-reflection surface of the deflector with respect to a sub-scanning direction.

2. The optical scanning device according to claim 1, wherein the plate is arranged to be inclined with respect to a virtual surface perpendicular to a direction of the light beams from the light source to the deflector.

3. The optical scanning device according to claim 1, wherein the plate shields the light beams reflected from the deflector toward the light source.

4. The optical scanning device according to claim 1, wherein the surface light-emitting lasers are arranged two dimensionally, and
   an interval between two surface light-emitting lasers located at both ends in a main scanning direction is larger than an interval between two surface light-emitting lasers located at both ends in a sub-scanning direction.

5. The optical scanning device according to claim 1, wherein the second optical system includes a first scanning optical system and a second scanning optical system arranged on sides of the deflector, respectively, and
   wherein the light beams directed from the deflector to the second optical system include light beams directed to the first scanning optical system that are inclined to a first side from the normal line, and light beams directed to the second scanning optical system that are inclined to a second side opposite to the first side from the normal line.

6. The optical scanning device according to claim 5, wherein the first scanning optical system and the second scanning optical system each include at least one reflection mirror that bends the optical path, and
   a difference in number of the reflection mirror between the first scanning optical system and the second scanning optical system is an even number.

7. The optical scanning device according to claim 1, wherein light beams are incident to one side of the deflector at an angle to the normal line with respect to at least the sub-scanning direction.

8. The optical scanning device according to claim 1, wherein light beams are incident to both sides of the deflector at an identical angle to the normal line.

9. The optical scanning device according to claim 1, wherein light beams incident to the deflection-reflection surface of the deflector include first light beams, and second light beams that are incident to a different position from where the first light beams are incident with respect to at least the sub-scanning direction, and
   wherein the first light beams and the second light beams are incident to the deflection-reflection surface of the deflector at an identical angle to the normal line.

10. The optical scanning device according to claim 1, wherein light beams incident to one side of the deflector include first light beams and second light beams, and
    the first light beams and the second light beams are incident to the side of the deflector at different angles to the normal line.

11. An image forming apparatus comprising:
    an image carrier on which a latent image is formed by electrophotography; and
    an optical scanning device that scans a surface of the image carrier with light beams based on image data for an exposure process in the electrophotography, the optical scanning device including
    a light source that includes a plurality of vertical-cavity surface light-emitting lasers (VCSEL) that each emit light beams in only one direction;
    a deflector that includes a deflection-reflection surface for deflecting the light beams from the light source;
    a first optical system that is arranged on an optical path of the light beams between the light source and the deflector, and guides the light beams from the light source to the deflector, the first optical system including a plate having an opening that defines a diameter of the light beams in at least a sub-scanning direction;

a second optical system that guides the light beams deflected by the deflector to the scanning surface; and a monitoring optical system that monitors an amount of light flux emitted from the plurality of surface light-emitting lasers, the amount of light flux monitored being used to correct a driving current of the plurality of vertical-cavity surface light-emitting lasers wherein light beams directed from the deflector to the second optical system are inclined from a normal line of the deflection-reflection surface of the deflector with respect to a sub-scanning direction.

12. The image forming apparatus according to claim 11, wherein the image data is of a multicolor image.

* * * * *